United States Patent
Natori

(10) Patent No.: US 12,487,786 B2
(45) Date of Patent: Dec. 2, 2025

(54) CONTROL DEVICE, DISPLAY METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Takashi Natori, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/612,154

(22) Filed: Mar. 21, 2024

(65) Prior Publication Data

US 2024/0319946 A1 Sep. 26, 2024

(30) Foreign Application Priority Data

Mar. 22, 2023 (JP) .................................. 2023-045055

(51) Int. Cl.
*G06F 3/14* (2006.01)
(52) U.S. Cl.
CPC .................................. *G06F 3/1423* (2013.01)
(58) Field of Classification Search
CPC ...................................................... G06F 3/1423
See application file for complete search history.

(56) References Cited

U.S. PATENT DOCUMENTS

| | | | | |
|---|---|---|---|---|
| 2011/0211065 A1* | 9/2011 | Furui | ................... | H04N 9/3185 |
| | | | | 348/135 |
| 2016/0297380 A1* | 10/2016 | Liu | ................... | B60K 35/60 |
| 2017/0214897 A1 | 7/2017 | Kado | | |
| 2017/0295229 A1* | 10/2017 | Shams | .................... | G06F 3/016 |

FOREIGN PATENT DOCUMENTS

| | | | | | |
|---|---|---|---|---|---|
| CN | 103369282 A | * | 10/2013 | ........... | G06F 3/1423 |
| CN | 109983964 A | * | 7/2019 | | |
| CN | 111397086 A | * | 7/2020 | ........... | F24F 1/0003 |
| JP | 2004142712 A | * | 5/2004 | | |
| JP | 2007-108205 A | | 4/2007 | | |
| JP | 2008-170522 A | | 7/2008 | | |
| JP | 2009069459 A | * | 4/2009 | | |
| JP | 2009-223112 A | | 10/2009 | | |
| JP | 2017-134112 A | | 8/2017 | | |
| JP | 2020-153930 A | | 9/2020 | | |
| WO | WO-2010084607 A1 | * | 7/2010 | ........... | G06F 3/1423 |

* cited by examiner

*Primary Examiner* — Ricardo Osorio
(74) *Attorney, Agent, or Firm* — Oliff PLC

(57) ABSTRACT

A control device includes at least one processor configured to control display on an optical device. The processor implements causing the optical device to display a reception image for receiving input of a management value for a factor concerning an environment in which a display apparatus is disposed, acquiring a measurement value for the factor from a sensing device provided in the display apparatus, and causing the optical device to display the management value, the input of which has been received, and the measurement value acquired from the sensing device.

7 Claims, 23 Drawing Sheets

FIG. 6

| APPARATUS ICON | GROUP NAME | EQUIPMENT NAME | MODEL NUMBER | POWER SUPPLY | INPUT | STATE |
|---|---|---|---|---|---|---|
| | SMALL MEETING ROOM | SMALL MEETING ROOM | M1 | OFF | - - - | |
| | LARGE MEETING ROOM | LARGE MEETING ROOM-1 | M1 | ON | VIDEO | |
| | LARGE MEETING ROOM | LARGE MEETING ROOM-2 | M2 | ON | VIDEO | |
| | LARGE HALL | LARGE HALL-1 | M10 | ON | LAN | |
| | LARGE HALL | LARGE HALL-2 | M10 | ON | LAN | |
| | LARGE HALL | LARGE HALL-3 | M11 | ON | LAN | |
| | LARGE HALL | LARGE HALL-4 | M10 | ON | LAN | |

FIG. 11

| APPARATUS ICON | GROUP NAME | EQUIPMENT NAME | MODEL NUMBER | OPERATION TIME | MANAGEMENT VALUE OF TEMPERATURE | TEMPERATURE MEASUREMENT VALUE | MANAGEMENT VALUE OF HUMIDITY | HUMIDITY MEASUREMENT VALUE | STATE |
|---|---|---|---|---|---|---|---|---|---|
| 🔲 | SMALL MEETING ROOM | SMALL MEETING ROOM | M1 | 10:00~17:00 | 24~30°C | 28°C | 5~95% | 78% | |
| 🔲 | LARGE MEETING ROOM | LARGE MEETING ROOM-1 | M1 | 9:00~17:00 | 24~30°C | 27°C | 5~95% | 75% | |
| 🔲 | LARGE MEETING ROOM | LARGE MEETING ROOM-2 | M2 | 9:00~17:00 | 24~30°C | 27°C | 5~95% | 75% | |
| 🔲 | LARGE HALL | LARGE HALL-1 | M10 | 8:00~20:00 | 24~30°C | 25°C | 5~95% | 70% | |
| 🔲 | LARGE HALL | LARGE HALL-2 | M10 | 8:00~20:00 | 24~30°C | 25°C | 5~95% | 70% | |
| 🔲 | LARGE HALL | LARGE HALL-3 | M11 | 8:00~20:00 | 24~30°C | 25°C | 5~95% | 70% | |
| 🔲 | LARGE HALL | LARGE HALL-4 | M10 | 8:00~20:00 | 24~30°C | 25°C | 5~95% | 70% | |

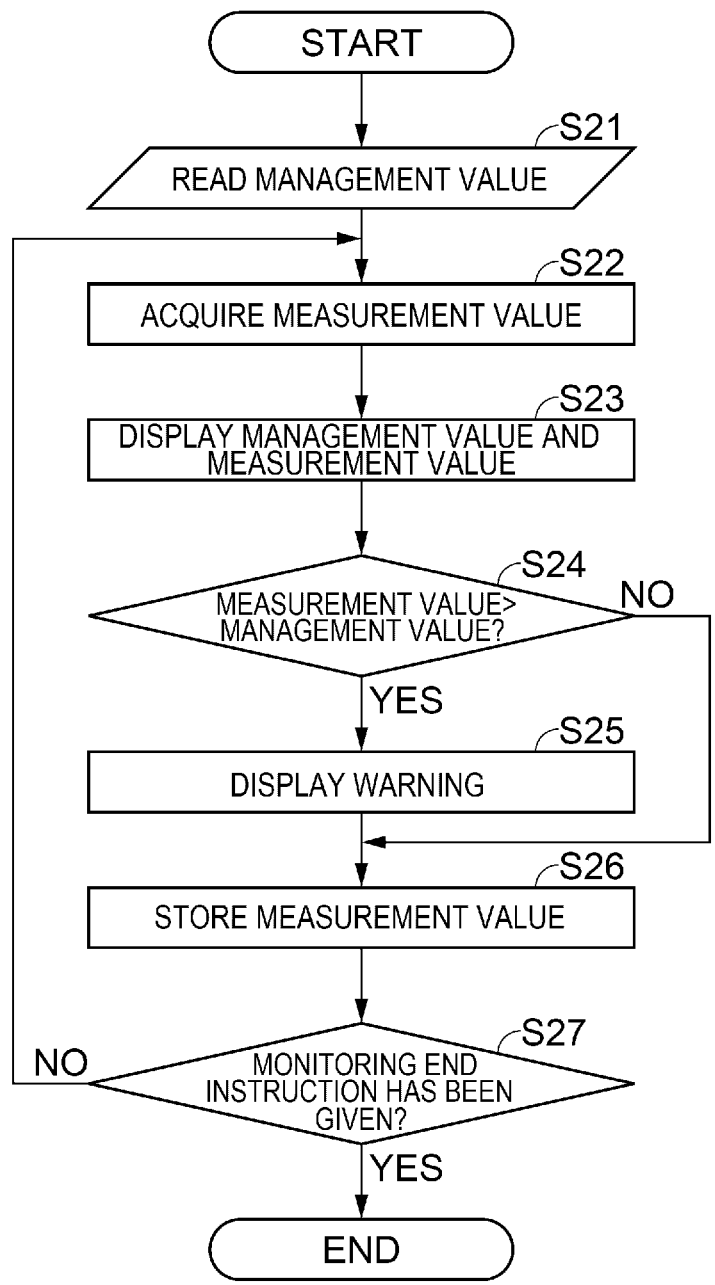

FIG. 13

| APPARATUS ICON | GROUP NAME | EQUIPMENT NAME | MODEL NUMBER | OPERATION TIME | MANAGEMENT VALUE OF TEMPERATURE | TEMPERATURE MEASUREMENT VALUE | MANAGEMENT VALUE OF HUMIDITY | HUMIDITY MEASUREMENT VALUE | STATE |
|---|---|---|---|---|---|---|---|---|---|
| | SMALL MEETING ROOM | SMALL MEETING ROOM | M1 | 10:00~17:00 | 24~30°C | 28°C | 5~95% | 78% | |
| | LARGE MEETING ROOM | LARGE MEETING ROOM-1 | M1 | 9:00~17:00 | 24~30°C | 27°C | 5~95% | 75% | |
| | LARGE MEETING ROOM | LARGE MEETING ROOM-2 | M2 | 9:00~17:00 | 24~30°C | 27°C | 5~95% | 75% | |
| | LARGE HALL | LARGE HALL-1 | M10 | 8:00~20:00 | 24~30°C | 31°C | 5~95% | 70% | WARNING: TEMPERATURE |
| | LARGE HALL | LARGE HALL-2 | M10 | 8:00~20:00 | 24~30°C | 25°C | 5~95% | 70% | |
| | LARGE HALL | LARGE HALL-3 | M11 | 8:00~20:00 | 24~30°C | 25°C | 5~95% | 70% | |
| | LARGE HALL | LARGE HALL-4 | M10 | 8:00~20:00 | 24~30°C | 25°C | 5~95% | 70% | |

| GROUP NAME | EQUIPMENT NAME | MODEL NUMBER | OPERATION TIME | TEMPERATURE WARNING HISTORY | HUMIDITY WARNING HISTORY |
|---|---|---|---|---|---|
| SMALL MEETING ROOM | SMALL MEETING ROOM | M1 | 10:00~17:00 | 0 | 0 |
| LARGE MEETING ROOM | LARGE MEETING ROOM-1 | M1 | 9:00~17:00 | 3 | 0 |
| LARGE MEETING ROOM | LARGE MEETING ROOM-2 | M2 | 9:00~17:00 | 1 | 0 |
| LARGE HALL | LARGE HALL-1 | M10 | 8:00~20:00 | 10 | 0 |
| LARGE HALL | LARGE HALL-2 | M10 | 8:00~20:00 | 10 | 0 |
| LARGE HALL | LARGE HALL-3 | M11 | 8:00~20:00 | 10 | 0 |
| LARGE HALL | LARGE HALL-4 | M10 | 8:00~20:00 | 12 | 0 |

FIG. 23

| INFORMATION TYPE | FIRST PROJECTOR FIRST INFORMATION GROUP | SECOND PROJECTOR SECOND INFORMATION GROUP | THIRD PROJECTOR THIRD INFORMATION GROUP |
|---|---|---|---|
| FIRST FAN ROTATING SPEED | 190 | 194 | 189 |
| SECOND FAN ROTATING SPEED | 130 | 129 | 135 |
| INTERNAL TEMPERATURE | 73 | 58 | 60 |
| EXTERNAL TEMPERATURE | 45 | 46 | 48 |
| INTERNAL HUMIDITY | 75 | 75 | 75 |
| CUMULATIVE USE TIME | 3000 | 3001 | 3000 |
| | 51,51A | 51,51B | 51,51C |

CONTROL DEVICE, DISPLAY METHOD, AND NON-TRANSITORY COMPUTER-READABLE STORAGE MEDIUM STORING PROGRAM

The present application is based on, and claims priority from JP Application Serial Number 2023-045055, filed Mar. 22, 2023, the disclosure of which is hereby incorporated by reference herein in its entirety.

BACKGROUND

1. Technical Field

The present disclosure relates to a control device, a display method, and a non-transitory computer-readable storage medium storing a program.

2. Related Art

JP-A-2009-223112 discloses a technique for appropriately setting a replacement period for a consumable component used in a projector, which is an example of a display apparatus. According to JP-A-2009-223112, a use limit threshold of the consumable component is set based on environment information concerning a use environment. The environment information concerning the use environment is input according to an assumed use environment. When a use amount of the consumable component has reached the use limit threshold, notification for urging maintenance of the consumable component is performed.

According to JP-A-2009-223112, it is possible to grasp, with the notification, that the use amount of the consumable component has reached the use limit threshold. However, a user cannot grasp a difference between the input environment information and an actual use environment.

SUMMARY

According to an aspect, there is provided a control device including: an optical device; and at least one processor configured to control display on the optical device. The at least one processor implements: causing the optical device to display a reception image for receiving input of a management value for a factor concerning an environment in which a display apparatus is disposed; acquiring a measurement value for the factor from a sensing device provided in the display apparatus; and causing the optical device to display the management value and the measurement value.

According to an aspect, there is provided a display method including: receiving input of a management value for a factor concerning an environment in which a display apparatus is disposed; acquiring a measurement value for the factor from a sensing device provided in the display apparatus; and displaying the management value and the measurement value on an optical device.

According to an aspect, there is provided a non-transitory computer-readable storage medium storing a program, the program causing a processor to execute: receiving input of a management value for a factor concerning an environment in which a display apparatus is disposed; acquiring a measurement value for the factor from a sensing device provided in the display apparatus; and causing an optical device to display the management value and the measurement value.

BRIEF DESCRIPTION OF THE DRAWINGS

FIG. 6 is a diagram showing an example of a first display image.

FIG. 11 is a diagram showing an example of a first monitoring image.

FIG. 12 is a flowchart showing a flow of display processing for displaying the first monitoring image.

FIG. 13 is a diagram showing an example of the first monitoring image.

FIG. 17 is a diagram showing an example of a second report image.

FIG. 23 is a diagram showing an example of an information group acquired from three projectors.

DESCRIPTION OF EMBODIMENTS

Figure 1:
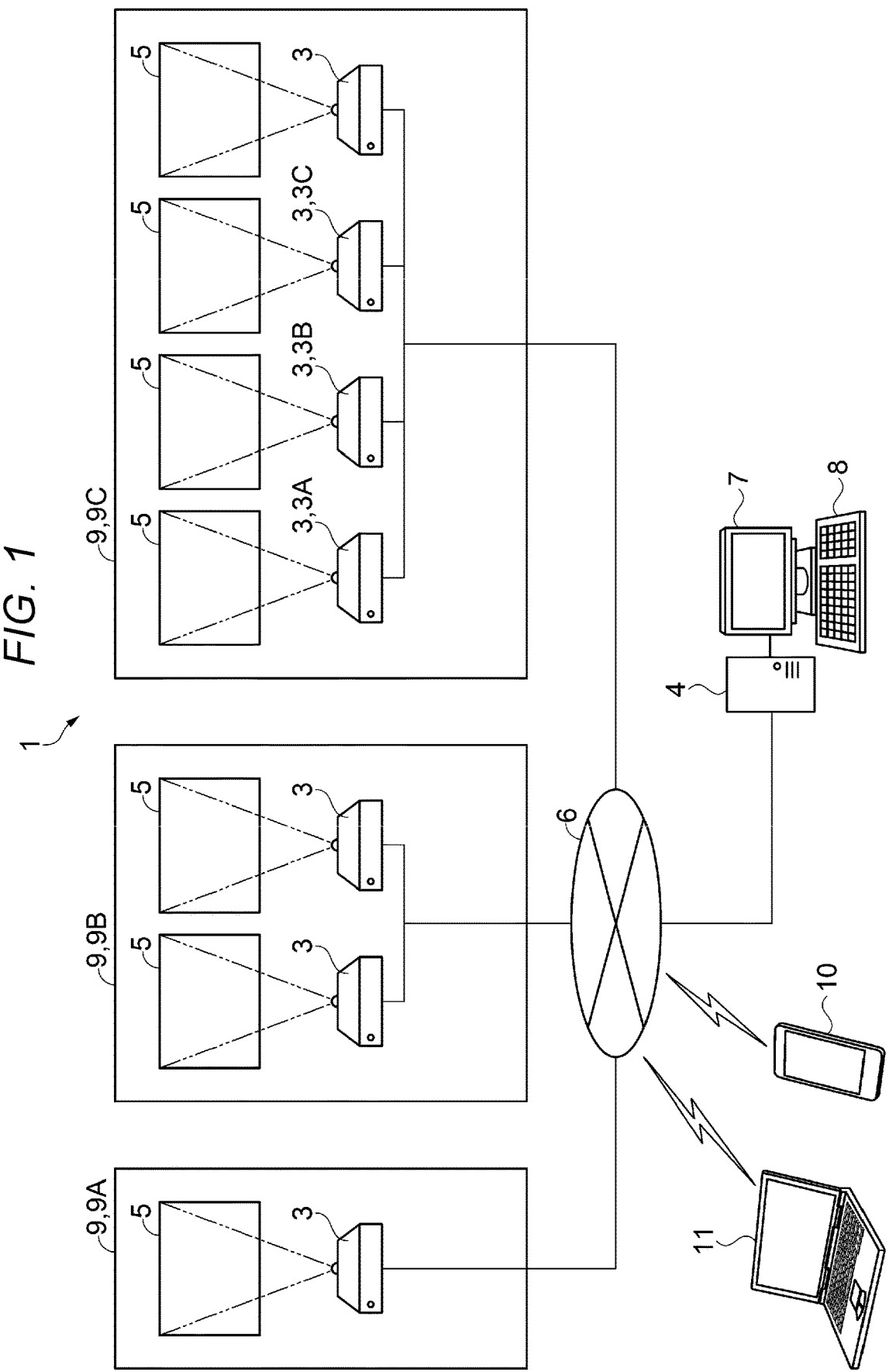
FIG. 1 is a diagram showing a control system.

As shown in FIG. 1, a control system 1 includes a plurality of projectors 3 and a control device 4. Each of the projectors 3 projects an image onto a projection surface 5 such as a screen or a wall surface. The projector 3 is an example of the display apparatus. Note that the image to be projected by the projector 3 is supplied to the projector 3 as image data from an image supply device explained below. The projector 3 projects the image onto the projection surface 5 based on the image data supplied from the image supply device. The plurality of projectors 3 are respectively connected to a network 6. The control device 4 is connected to the network 6. Each of the projectors 3 and the control device 4 is communicably connected via the network 6. A configuration in which the plurality of projectors 3 and the control device 4 are connected via the network 6 is referred to as control system 1.

The network 6 is, for example, a LAN (Local Area Network). Communication is executed according to an Ethernet (registered trademark) standard. The connection between each of the projectors 3 and the network 6 is not limited to wired connection and may be wireless connection. The connection between the control device 4 and the network 6 is not limited to wired connection and may be wireless connection. The control system 1 monitors the plurality of projectors 3 using the control device 4. The control device 4 is, for example, a server device. The control device 4 may include a display monitor 7. The control device 4 may include an input device 8. The display monitor 7 displays various kinds of information. The display monitor 7 is an example of the optical device. The input device 8 is, for example, a mouse and a keyboard. An operator can input various data to the control device 4 via the input device 8.

In the control system 1, the plurality of projectors 3 are divided into a plurality of groups 9. In the control system 1, the plurality of groups 9 are divided for each place where the projector 3 is disposed. The place where the projector 3 is disposed is an example of an environment in which the projector 3 is disposed. In an example shown in FIG. 1, the plurality of groups 9 are divided into three groups 9 to correspond to three places of a small meeting room 9A, a large meeting room 9B, and a large hall 9C. In the example shown in FIG. 1, one projector 3 is disposed in the small meeting room 9A, two projectors 3 are disposed in the large meeting room 9B, and four projectors 3 are disposed in the large hall 9C.

The control device 4 monitors a state of each of the projectors 3. Examples of the state of the projector 3 include ON and OFF states of a power supply, states of temperature and humidity of the projector 3, and a state of error occurrence. A result of the monitoring is notified to the operator of the control system 1 by causing the display monitor 7 to display a display screen. The result of the monitoring may be notified by causing a terminal such as a smartphone 10 or a PC (Personal Computer) 11 to display a display screen. In this case, the smartphone 10 or the PC 11 is also an example of the optical device. In this case, the display monitor 7 and the input device 8 of the control system 1 may be omitted. The operator of the control system 1 indicates a person who accesses the control system 1 via the control device 4, the smartphone 10, the PC 11, or the like.

Figure 2:
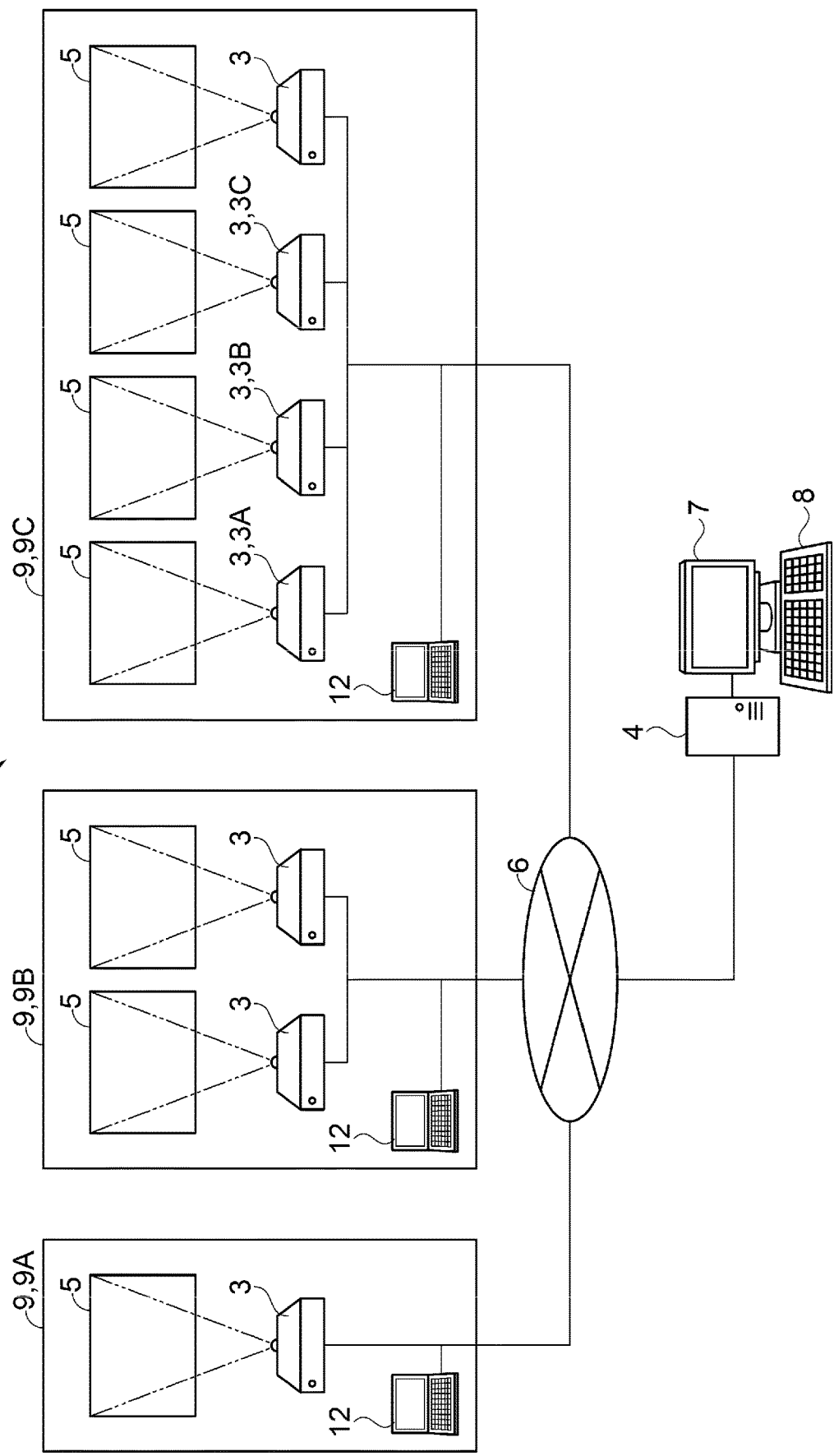
FIG. 2 is a diagram illustrating connection of image supply devices and projectors.

As shown in FIG. 2, an image supply device 12 can be connected to the projector 3. The image supply device 12 is, for example, a personal computer. The plurality of projectors 3 display images based on image data received from the image supply device 12. The plurality of projectors 3 project image light based on the image data to thereby display images on projection surfaces 5.

The image supply device 12 can be communicably connected to the projector 3 via the network 6. The connection between the image supply device 12 and the network 6 is not limited to wired connection and may be wireless connection. The image supply device 12 can also be directly connected to the projector 3 not via the network 6. The direct connection between the image supply device 12 and the projector 3 is not limited to wired connection and may be wireless connection. A user who uses the projector 3 can use the projector 3 in a desired place among the small meeting room 9A, the large meeting room 9B, and the large hall 9C.

A user present in the small meeting room 9A can use the one projector 3 belonging to the group 9 of the small meeting room 9A. A user present in the large meeting room 9B can use the two projectors 3 belonging to the group 9 of the large meeting room 9B. A user present in the large hall 9C can use the four projectors 3 belonging to the group 9 of the large hall 9C. A plurality of users can use the projectors 3 belonging to the respective groups 9. When a plurality of users are present in the small meeting room 9A, the plurality of users can use the one projector 3 by turns.

When a plurality of users are present in the large meeting room 9B, the plurality of users can properly use the two projectors 3. When the plurality of users are present in the large meeting room 9B, the plurality of users can also use the two projectors 3 by turns. One user may use the two projectors 3 present in the large meeting room 9B for different purposes. Further, multi-projection for projecting one image using the two projectors 3 present in the large meeting room 9B can also be implemented.

When a plurality of users are present in the large hall 9C, the plurality of users can properly use the four projectors 3. When the plurality of users are present in the large hall 9C, the plurality of users can also use the four projectors 3 by turns. One user may use the four projectors 3 present in the large hall 9C for different purposes. Further, multi-production for projecting one image using the four projectors 3 present in the large hall 9C can also be implemented.

Figure 3:
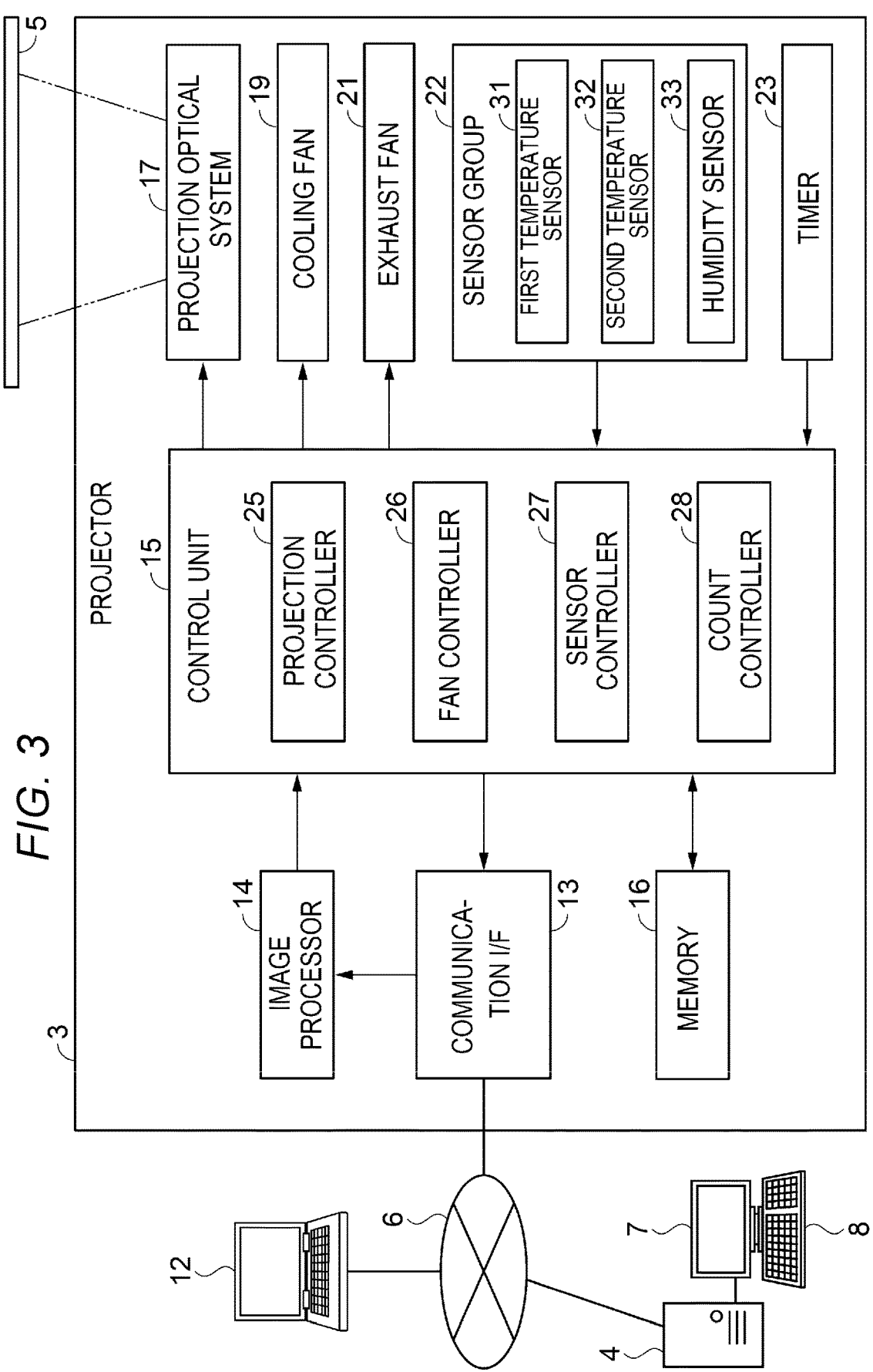
FIG. 3 is a block diagram illustrating a configuration of the projector.

As shown in FIG. 3, the projector 3 includes a communication interface 13, an image processor 14, a control unit 15, a memory 16, and a projection optical system 17. Further, the projector 3 includes a cooling fan 19, an exhaust fan 21, a sensor group 22, and a timer 23. In FIG. 3, interface is described as I/F. The communication interface 13 is communicatively connected to external devices such as the image supply device 12 and the control device 4.

The communication interface 13 communicates with the external devices according to a predetermined communication protocol. A form of the communication may be either wired or wireless. The communication interface 13 includes, for example, a connection port for wired communication, an antenna for wireless communication, and an interface circuit. The communication interface 13 receives image data from the image supply device 12. The communication interface 13 transmits various data to the control device 4. The communication interface 13 outputs the image data received from the image supply device 12 to the image processor 14.

The image processor 14 loads the input image data in a not-shown frame memory and performs image processing on the loaded image data. The image processing performed by the image processor 14 includes, for example, resolution conversion processing, shape correction processing such as distortion correction, digital zoom processing, tone correction processing, and luminance correction processing. The image processor 14 reads, from the frame memory, the image data for which the processing has ended and outputs the read image data to the projection optical system 17 as image information via the control unit 15.

The control unit 15 is a projector controller that controls the projector 3. The control unit 15 executes a projector control program stored in the memory 16 to thereby collectively control an operation of the projector 3. The memory 16 is configured with a RAM (Random Access Memory), a ROM (Read Only Memory), and the like. The RAM is used for temporary storage of various data and the like. The ROM stores a control program for controlling the operation of the projector 3, various kinds of setting information, and the like. The memory 16 may include the frame memory explained above.

The image processor 14 and the control unit 15 are, as an example, processors including a single or a plurality of CPUs or MPUs. CPU is an abbreviation of "Central Processing Unit". MPU is an abbreviation of "Micro Processing Unit". The image processor 14 and the control unit 15 can also be configured with an integrated circuit. The integrated circuit includes an LSI, an ASIC, and a PLD. LSI is an abbreviation of "Large Scale Integration". ASIC is an abbreviation of "Application Specific Integrated Circuit". PLD is an abbreviation of "Programmable Logic Device". The PLD includes, for example, an FPGA (Field-Programmable Gate Array). An analog circuit may be included in a part of a configuration of the integrated circuit. The processor and the integrated circuit may be combined. The combination of the processor and the integrated circuit is called microcontroller (MCU), SoC (System-on-a-chip), system LSI, chip set, and the like.

The control unit 15 executes the control program stored in the memory 16 to thereby function as various functional units. The control unit 15 includes, as the functional units, a projection controller 25, a fan controller 26, a sensor controller 27, and a count controller 28. The control unit 15 executes the control program stored in the memory 16 to thereby function as the projection controller 25, the fan controller 26, the sensor controller 27, and the count controller 28.

The projection controller 25 controls the projection optical system 17. The projection optical system 17 includes a light source, a light modulation device, and a projection lens. A lamp, a laser light source, or the like is applied as the light source. The light modulation device includes a light modulation element. The light modulation device modulates light from the light source with the light modulation element based on image data. For example, a transmissive liquid crystal panel is applied as the light modulation element. The projection controller 25 outputs image data received from the image processor 14 to the projection optical system 17. The projection controller 25 controls the projection optical system 17 to thereby cause the projection optical system 17 to project an image based on the image data. Note that the light modulation element may include a reflective liquid crystal panel or an LCOS (Liquid Crystal On Silicon) liquid crystal panel instead of the transmissive liquid crystal panel. The light modulation element may include a light modulation panel other than the liquid crystal panel, for example, a DMD (Digital Micromirror Device).

The fan controller 26 controls the cooling fan 19 and the exhaust fan 21. The cooling fan 19 cools the projection optical system 17. The cooling fan 19 includes a fan that feeds wind toward the projection optical system 17 and a motor that generates power for driving the fan. The fan controller 26 controls driving of the motor to thereby control the driving of the cooling fan 19. The exhaust fan 21 discharges air at the inside of the projector 3 toward the outside. The exhaust fan 21 includes a fan and a motor that generates power for driving the fan. The fan controller 26 controls driving of the motor to thereby control the driving of the exhaust fan 21.

The fan controller 26 detects rotating speeds of the cooling fan 19 and the exhaust fan 21 at the time when the cooling fan 19 and the exhaust fan 21 are driven. The rotating speeds of the cooling fan 19 and the exhaust fan 21 are replaced by rotating speeds of the motors that drive the cooling fan 19 and the exhaust fan 21. That is, the fan controller 26 detects rotating speeds of the respective motors at the time when the motors drive the cooling fan 19 and the exhaust fan 21. The rotating speeds of the motors are detected by measuring values of electric currents flowing to coils of the motors. The rotating speeds of the cooling fan 19 and the exhaust fan 21 are respectively kinds of information indicating a state of the projector 3. The rotating speeds of the cooling fan 19 and the exhaust fan 21 are respectively stored in the memory 16 as data of first fan rotating speed and second fan rotating speed. The data of the first fan rotating speed and the second fan rotating speed are transmitted from the communication interface 13 to the control device 4.

The sensor controller 27 controls the sensor group 22. The sensor group 22 includes a first temperature sensor 31, a second temperature sensor 32, and a humidity sensor 33. The first temperature sensor 31 is disposed near the projection optical system 17. The first temperature sensor 31 detects temperature near the projection optical system 17. The first temperature sensor 31 outputs, based on an instruction of the sensor controller 27, a result of detecting the temperature to the control unit 15 as an internal temperature. The second temperature sensor 32 is disposed near a ventilation hole formed in a not-shown exterior case of the projector 3. The ventilation hole is an inlet/outlet for air in the exterior case. The air in the exterior case is discharged to the outside of the exterior case from the ventilation hole by the driving of the exhaust fan 21.

The second temperature sensor 32 detects temperature near the ventilation hole. The second temperature sensor 32 outputs, based on an instruction of the sensor controller 27, a result of detecting the temperature to the control unit 15 as an external temperature. Data of the internal temperature and the external temperature received by the control unit 15 are stored in the memory 16. The data of the internal temperature and the external temperature are transmitted from the communication interface 13 to the control device 4.

The humidity sensor 33 is disposed in the not-shown exterior case of the projector 3. The humidity sensor 33 detects the humidity of the inside of the projector 3. The humidity sensor 33 outputs, based on an instruction of the sensor controller 27, a result of detecting the humidity to the control unit 15 as an internal humidity. Data of the internal humidity received by the control unit 15 is stored in the memory 16. The data of the internal humidity is transmitted from the communication interface 13 to the control device 4. The first temperature sensor 31, the second temperature sensor 32, and the humidity sensor 33 are respectively examples of the sensing device.

The count controller 28 controls the timer 23 to thereby measure various times. Examples of the times measured by the count controller 28 include a cumulative operation time of the light source of the projection optical system 17, a cumulative operation time of the cooling fan 19, and a cumulative operation time of the exhaust fan 21. The projector 3 includes a not-shown filter. The filter is disposed in, for example, the ventilation hole of the exterior case. The filter captures foreign matters such as dust floating in air flowing in from the ventilation hole. Examples of the times measured by the count controller 28 also include a cumulative use time of the filter. Replacement timings for various replacement components are taken by measuring the various cumulative operation times and the cumulative use time explained above. That is, replacement timings for replacement components such as the light source, the cooling fan 19, the exhaust fan 21, and the filter are taken by the count controller 28 measuring the various times.

Figure 4:
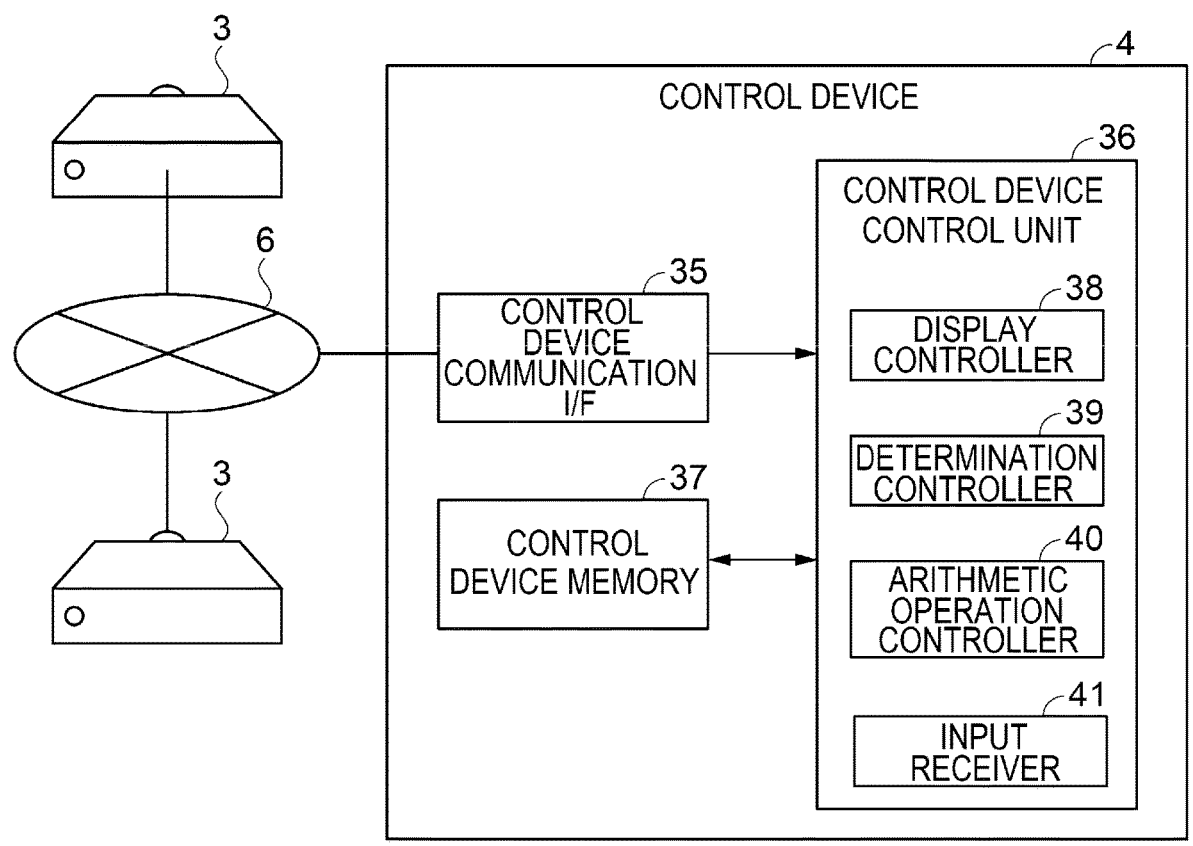
FIG. 4 is a block diagram illustrating a configuration of a control device.

As shown in FIG. 4, the control device 4 includes a control device communication interface 35, a control device control unit 36, and a control device memory 37. In FIG. 4, interface is described as I/F. The control device communication interface 35 is communicatively connected to the projector 3. The control device communication interface 35 communicates with the projector 3 according to a predetermined communication protocol. A form of the communication may be either wired or wireless. The control device 4 can also be communicatively connected to the smartphone 10 and the PC 11 shown in FIG. 1 via the control device communication interface 35.

The control device communication interface 35 includes, for example, a connection port for wired communication, an antenna for wireless communication, and an interface circuit. The control device communication interface 35 receives information indicating a state of each of the projectors 3 from each of the projectors 3. The control device communication interface 35 outputs the information received from the projector 3 to the control device control unit 36. The control device control unit 36 stores the information received from the projector 3 in the control device memory 37.

The control device control unit 36 is a control device controller that controls the control device 4. As an example, the control device control unit 36 is a processor including a CPU (Central Processing Unit) or an MPU (Micro Processing Unit). The control device control unit 36 executes a control program stored in the control device memory 37 to thereby collectively control an operation of the control device 4. The control device memory 37 is configured with a RAM (Random Access Memory), a ROM (Read Only Memory), and the like. The RAM is used for temporary storage of various data and the like. The ROM stores a control program for controlling the operation of the control device 4, various kinds of setting information, and the like.

The control device control unit 36 executes the control program stored in the control device memory 37 to thereby function as various functional units. The control device control unit 36 includes, as the functional units, a display controller 38, a determination controller 39, an arithmetic operation controller 40, and an input receiver 41. The control device control unit 36 executes the control program stored in the control device memory 37 to thereby function as the display controller 38, the determination controller 39, the arithmetic operation controller 40, and the input receiver 41.

The display controller 38 controls the display monitor 7 shown in FIG. 1 to thereby cause the display monitor 7 to display various kinds of information. The determination controller 39 shown in FIG. 4 determines a state of the projector 3 based on information received from the projector 3. The arithmetic operation controller 40 implements various kinds of arithmetic processing based on information received from the projector 3. The input receiver 41 receives input of various data input by the operator via the input device 8 shown in FIG. 1.

Figure 5:
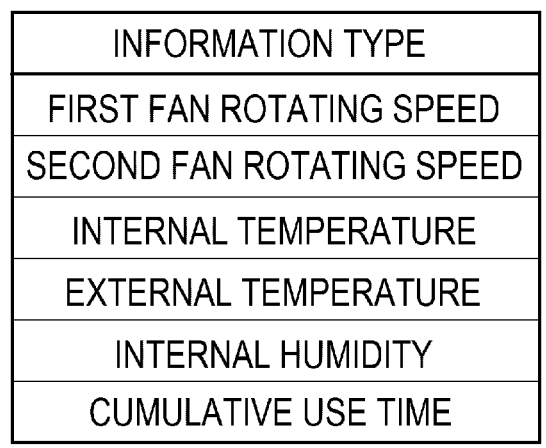
FIG. 5 is a diagram showing a configuration example of an information group.

An example of the information received from the projector 3 by the control device 4 is explained. Types of the information received from the projector 3 by the control device 4 are, for example, six types as shown in FIG. 5. The six types of information are, for example, first fan rotating speed, second fan rotating speed, an internal temperature, an external temperature, an internal humidity, and a cumulative use time. The six types of information are respectively factors concerning an environment in which the projector 3 is disposed. The six types of information form an information group 51. The control device 4 receives the six types of information from the projector 3 as the information group 51. The six types of information respectively indicate states of the projector 3. The factors concerning the environment in which the projector 3 is disposed can also be considered information directly or indirectly indicating factors that can affect the performance of the projector 3 concerning the environment.

Besides the information group 51, the control device 4 also acquires a state of ON and OFF of a power supply of each of the projectors 3, a state of error occurrence of each of the projectors 3, and the like. FIG. 6 shows an example of a first display image 52. The first display image 52 shows states of the plurality of projectors 3 in a list format. As shown in FIG. 6, the state of ON and OFF of the power supply of each of the projectors 3, the state of error occurrence of each of the projector 3, and the like can be viewed in the list format. The first display image 52 shown in FIG. 6 is displayed on the display monitor 7 shown in FIG. 1. The display by the display monitor 7 is controlled by the display controller 38 shown in FIG. 4.

As shown in FIG. 6, the first display image 52 displays an apparatus icon 53, a group name, an equipment name, a model number, a power supply state, an input state, and other states. The apparatus icon 53 indicates a type of a display apparatus. In the example shown in FIG. 6, all of seven display apparatuses are the projectors 3. Examples of the types of the display apparatuses include, besides the projectors 3, types such as a liquid crystal display apparatus and an organic EL (Electro Luminescence) display apparatus. The group name indicates a name given to a group of each of the environments in which the projectors 3 are disposed. In this embodiment, the group name indicates each of the small meeting room 9A, the large meeting room 9B, and the large hall 9C.

The equipment name indicates a name given to each of the projectors 3. The plurality of projectors 3 can be individually identified one by one by the equipment name. The model number indicates a model of the projector 3. The model of the projector 3 can be specified by the model number. The power supply state indicates whether the power supply of each of the projectors 3 is on or off. The power supply state being displayed as "ON" indicates that the power supply is on. The power supply state being displayed as "OFF" indicates that the power supply is off. The input state indicates a transmission path of image data supplied from the image supply device 12. The other states indicate, for example, information concerning an error that occurs in the projector 3. With the first display image 52 shown in FIG. 6, the operator of the control system 1 can view the states of the plurality of projectors 3 in a list format.

Figure 7:
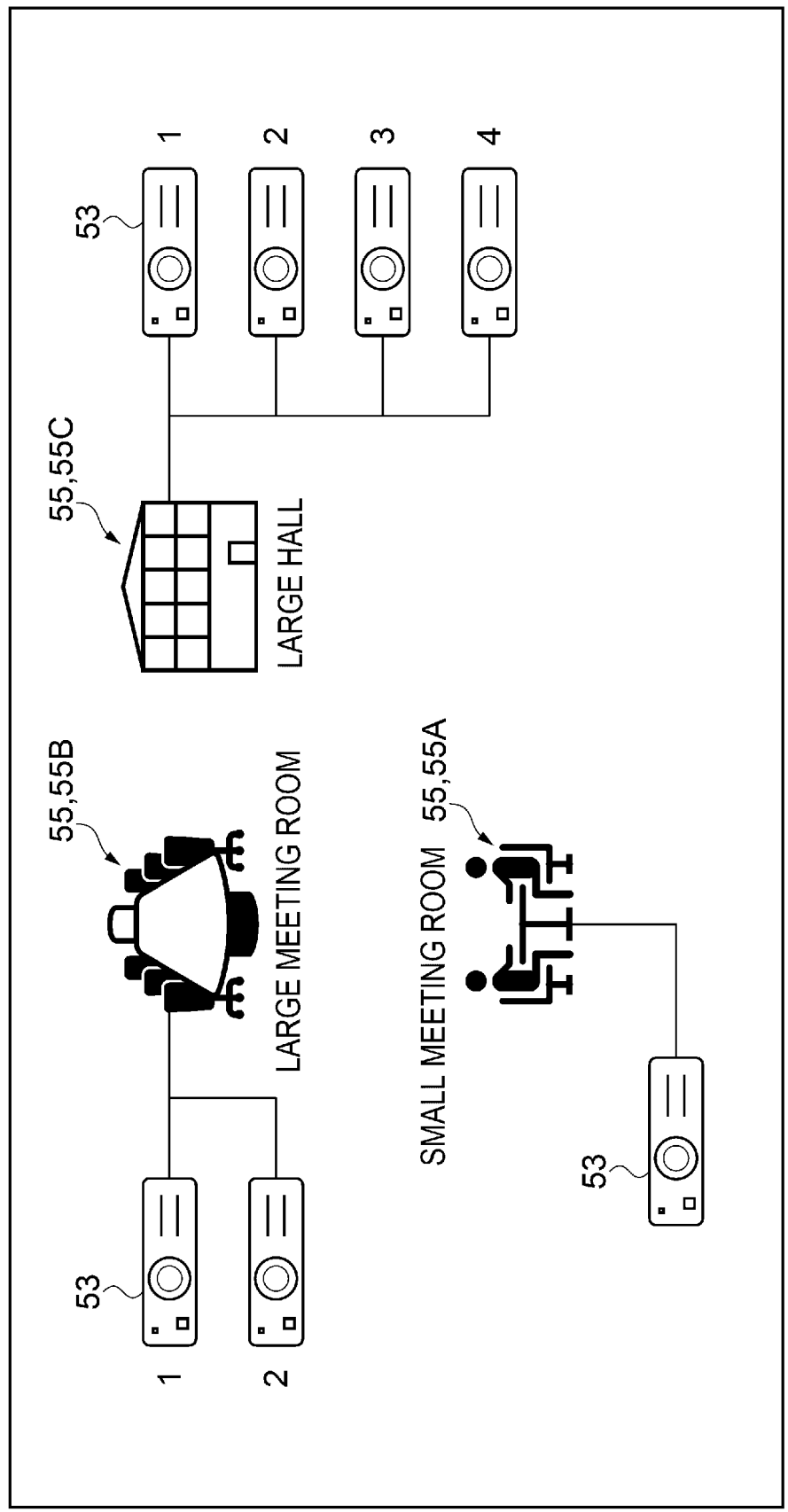
FIG. 7 is a diagram showing an example of a second display image.

FIG. 7 shows an example of the second display image 54. The second display image 54 shows states of the plurality of projectors 3 in a list format. The second display image 54 includes group icons 55. The group icons 55 are icons given to the groups 9. As the group icons 55, different icons are given for each of the groups 9. In this embodiment, the group icons 55 include a group icon 55A, a group icon 55B, and a group icon 55C. The group icon 55A indicates the small meeting room 9A. The group icon 55B indicates the large meeting room 9B. The group icon 55C indicates the large hall 9C.

To each of the group icons 55, the apparatus icon 53 indicating the projector 3 belonging to the group 9 indicated by the group icon 55 are linked. In the second display image 54, an equipment name is allocated to the apparatus icon 53. That is, in the second display image 54, for each of the groups 9, a name of the projector 3 belonging to the group 9 can be identified. For example, the apparatus icon 53 indicating the four projectors 3 belonging to the large hall 9C is linked to the group icon 55C indicating the large hall 9C.

Equipment names of the four projectors 3 belonging to the large hall 9C are a large hall-1, a large hall-2, a large hall-3, and a large hall-4 shown in FIG. 6. That is, the apparatus icons 53 indicating the large hall-1, the large hall-2, the large hall-3, and the large hall-4 are linked to the group icon 55C.

With the second display image 54 shown in FIG. 7, the operator of the control system 1 can visually view the states of the plurality of projectors 3 in a list format. Consequently, it is possible to improve a visual effect concerning grasping of a monitoring state.

Figure 8:
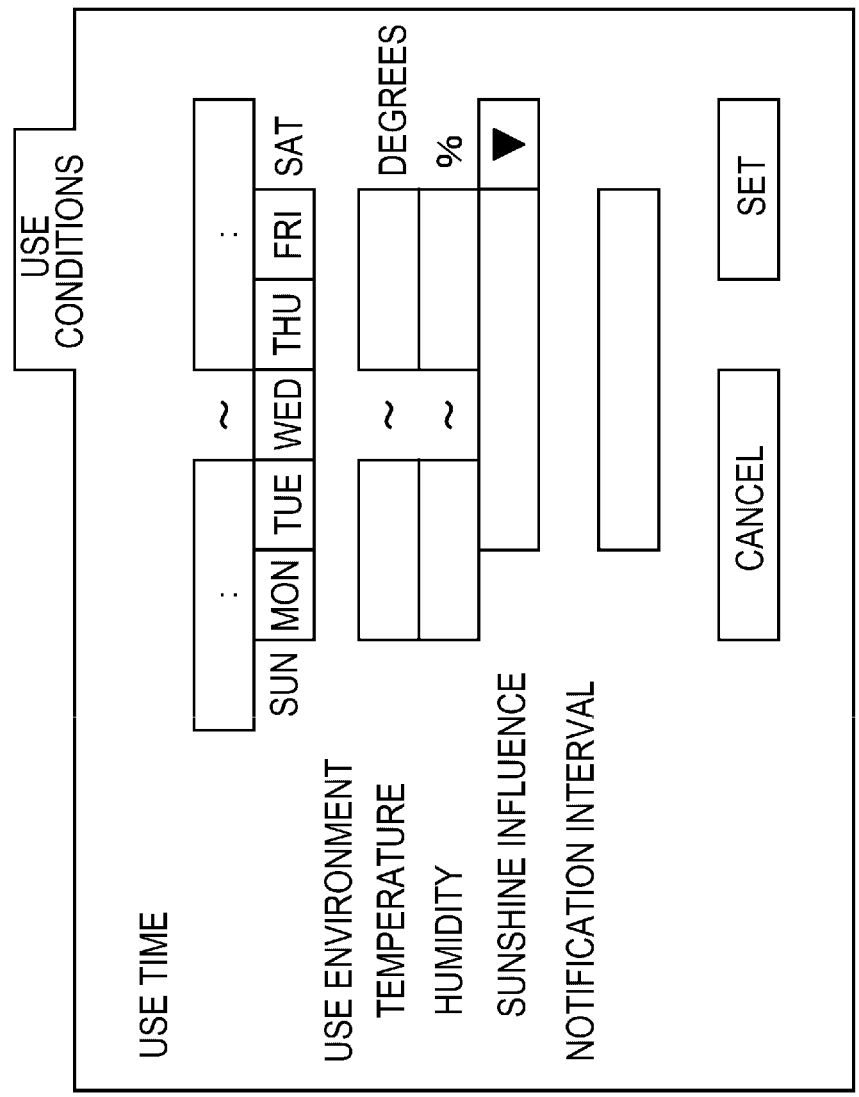
FIG. 8 is a diagram showing an example of a reception image.

In the control system 1, the operator of the control system 1 can set various management values for factors concerning an environment in which the projectors 3 are disposed. A method of inputting management values is explained using temperature and humidity as examples of the factors concerning the environment in which the projector 3 is disposed. FIG. 8 shows an example of a reception image 57. The reception image 57 is an example of a UI (User Interface). Input of management values for temperature and humidity to the control device 4 is received via the reception image 57. The operator of the control system 1 can input management values for temperature and humidity via the reception image 57 for each of the projectors 3. The reception image 57 is displayed on the display monitor 7 according to control by the display controller 38 shown in FIG. 4.

As shown in FIG. 8, in the reception image 57, a use time, a use environment, and a notification interval can be input for each of the projectors 3. The use time is a time when the projector 3 operates and a day of week when the projector 3 operates. The use environment is a management value of temperature, a management value of humidity, and sunshine influence. The management value of temperature is a management value for an internal temperature of the projector 3. In the control system 1, the internal temperature of the projector 3 can be monitored with respect to a management value of temperature set by the operator. When the internal temperature of the projector 3 has exceeded the management value, the control device 4 causes the display monitor 7 to display information indicating that the internal temperature has exceeded the management value of temperature.

The management value of humidity is a management value for an internal humidity of the projector 3. In the control system 1, the internal humidity of the projector 3 can be monitored with respect to a management value of humidity set by the operator. When the internal humidity of the projector 3 has exceeded the management value of humidity, the control device 4 causes the display monitor 7 to display information indicating that the internal humidity has exceeded the management value of humidity. The sunshine influence is information indicating a time period in which solar radiation is incident on the projector 3. The sunshine influence is an example of the first time period information and is an example of the supplementary information. A field for receiving input of the sunshine influence in the reception image 57 is an example of the supplementary information reception image. Note that an image for receiving input of the sunshine influence may be an image different from the reception image 57.

The notification interval is an interval for causing the display monitor 7 to display a periodic report. With this setting, the operator can view, at a predetermined time interval or a designated date and time, as the periodic report, a monitoring result of the plurality of projectors 3 by the control system 1. The periodic report may be distributed to the operator of the control system 1 by electronic mail at the predetermined time interval or the designated date and time.

Note that the supplementary information is not limited to the sunshine influence. As the supplementary information, information indicating a time period in which an air conditioner acting on the projector 3 operates can also be applied. Further, as the supplementary information, both of a time period in which solar radiation is incident on the projector 3 and the time period in which the air conditioner acting on the projector 3 operates can also be applied. The information indicating the time period in which the air conditioner acting on the projector 3 operates is an example of the second time period information.

Figure 9:
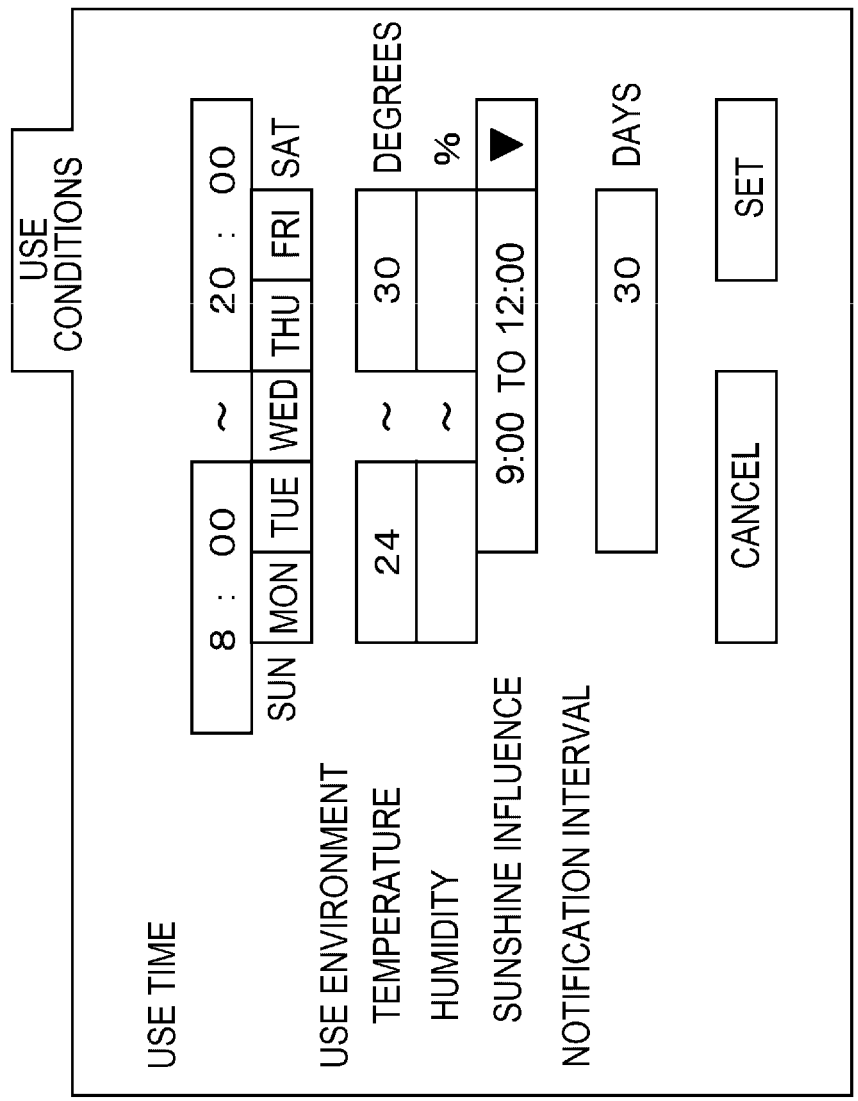
FIG. 9 is a diagram showing an example of input to the reception image.

FIG. 9 shows an example of input to the reception image 57. The operator of the control system 1 can input a use time, a use environment, and a notification interval via the reception image 57 as shown in FIG. 9. In the example shown in FIG. 9, the use time is 8:00 to 20:00 on Monday to Friday. Note that an input form of the use time may be a form in which a different time period can be designated for each date. In the example shown in FIG. 9, as the use environment, the management value of temperature is 24° C. to 30° C. Input of the management value of humidity is omitted. The sunshine influence is 9:00 to 12:00. The notification interval is thirty days. Input of these input values is received by the input receiver 41 from the control device communication interface 35 shown in FIG. 4. The input values receive by the input receiver 41 are stored in the control device memory 37.

Figure 10:
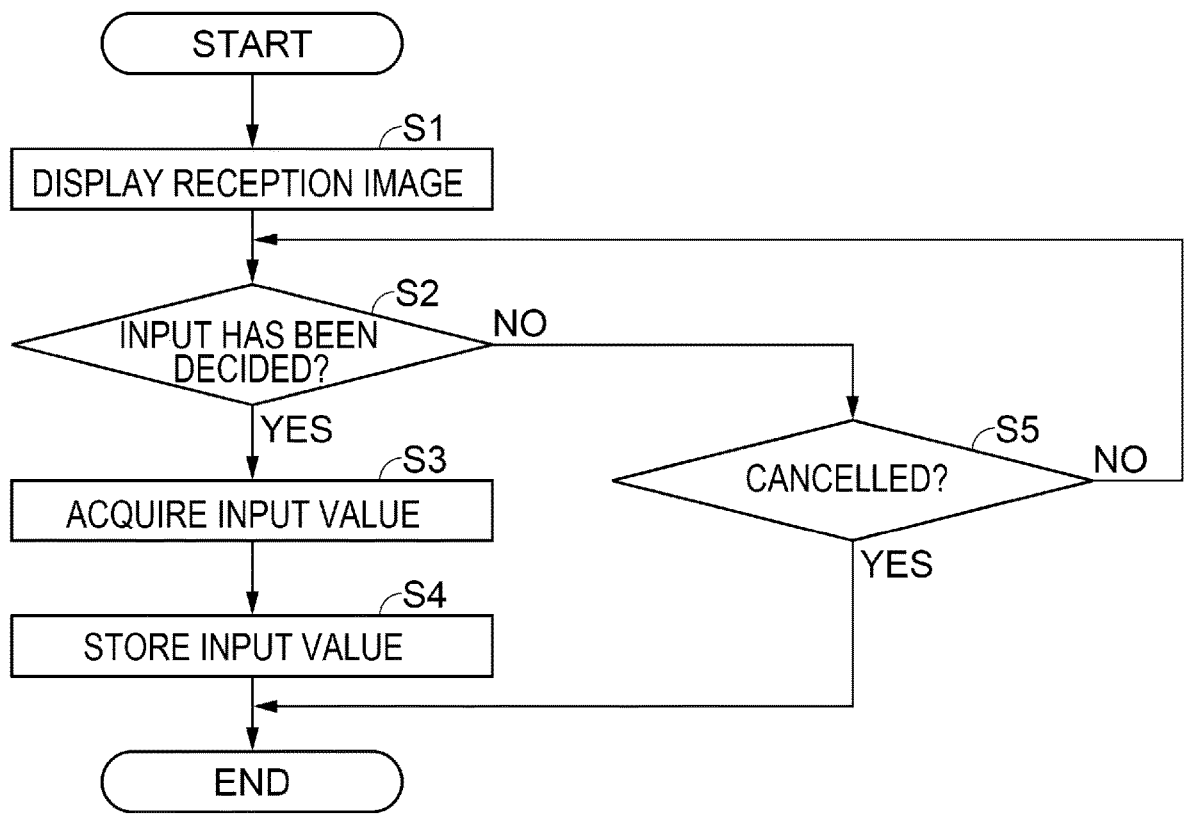
FIG. 10 is a flowchart showing a flow of reception processing.

FIG. 10 shows a flow of reception processing for receiving input. The reception processing is implemented by the control device control unit 36 of the control device 4 executing a reception method according to a reception program. As shown in FIG. 10, the input reception processing includes step S1 to step S5. In step S1, the control device control unit 36 causes the display monitor 7 to display the reception image 57. Subsequently, in step S2, the control device control unit 36 determines whether input via the reception image 57 has been determined.

At this time, the control device control unit 36 determines, according to whether a setting button of the reception image 57 shown in FIG. 9 has been pressed, whether the input has been determined. When the setting button of the reception image 57 is pressed by the operator of the control system 1, the control device control unit 36 determines that the input has been determined. When a determination result in step S2 shown in FIG. 10 is YES, that is, when the input has been determined, the control device control unit 36 shifts to step S3. When the determination result in step S2 is NO, that is, when the input has not been determined, the control device control unit 36 shifts to step S5. In step S3, the control device control unit 36 acquires an input value input via the reception image 57. Subsequently, in step S4, the control device control unit 36 stores the acquired input value in the control device memory 37.

In step S5, the control device control unit 36 determines whether the input has been cancelled. At this time, the control device control unit 36 determines, according to whether a cancel button of the reception image 57 shown in FIG. 9 has been pressed, whether the input has been cancelled. When the cancel button of the reception image 57 is pressed by the operator of the control system 1, the control device control unit 36 determines that the input has been cancelled. When a determination result in step S5 shown in FIG. 10 is YES, that is, when the input has been cancelled, the control device control unit 36 ends the reception processing. When the determination result in step S5 is NO, that is, when the input has not been cancelled, the control device control unit 36 shifts to step S2. Note that step S1 shown in FIG. 10 corresponds to the display controller 38. Step S3 and step S4 correspond to the input receiver 41.

FIG. 11 shows an example of a first monitoring image 58. The first monitoring image 58 is an example of a monitoring result by the control system 1. The first monitoring image 58 is displayed on the display monitor 7 in real time according to control by the display controller 38 shown in FIG. 4. As shown in FIG. 11, in the first monitoring image 58, states of the plurality of projectors 3 can be visually recognized in a list format. The first monitoring image 58 displays the apparatus icon 53, a group name, an equipment name, a model number, an operation time, a management value of temperature, a temperature measurement value, a management value of humidity, and a humidity measurement value. The apparatus icon 53, the group name, the equipment name, and the model number are the same as those of the first display image 52 shown in FIG. 6. Therefore, explanation thereof is omitted.

The operation time, the management value of temperature, and the management value of humidity are respectively input values, input of which has been received by the input receiver 41 via the reception image 57. That is, the operation time, the management value of temperature, and the management value of humidity are respectively input values input by the operator of the control system 1 via the reception image 57. The temperature measurement value and the humidity measurement value are respectively measurement values detected by the sensor group 22 shown in FIG. 3. The temperature measurement value is an internal temperature detected by the first temperature sensor 31. The humidity measurement value is an internal humidity detected by the humidity sensor 33.

As shown in FIG. 11, the first monitoring image 58 can display a management value, input of which has been received by the control device 4, and a measurement value acquired from the projector 3 by the control device 4. The management value, the input of which has been received by the control device 4, is a management value for a factor concerning an environment in which the projector 3 is disposed. The measurement value acquired from the projector 3 by the control device 4 is a measurement value acquired from the sensor group 22. The measurement value acquired from the sensor group 22 is a measurement value for the factor concerning the environment in which the projector 3 is disposed. That is, with the control device 4, the management value and the measurement value can be informed to the operator of the control system 1 via the display monitor 7. Note that, in the example shown in FIG. 9, input of the management value of humidity is omitted in the reception image 57. When input of the management value of temperature or humidity is omitted, an allowable value set as default in the control system 1 may be applied instead of the management value.

FIG. 12 shows a flow of display processing for displaying the first monitoring image 58. The display processing is implemented by the control device control unit 36 of the control device 4 executing a display method according to a display program. As shown in FIG. 12, the display processing for the first monitoring image 58 includes step S21 to step S27. In step S21, the control device control unit 36 reads management values from the control device memory 37. Subsequently, in step S22, the control device control unit 36 acquires various measurement values from each of the projectors 3. The measurement values acquired from each of the projectors 3 are the information group 51 shown in FIG. 5.

Subsequently, in step S23 shown in FIG. 12, the control device control unit 36 controls display of a management value and a measurement value. In step S23, the control device control unit 36 causes the display monitor 7 to display the management value and the measurement value. At this time, the control device control unit 36 causes the display monitor 7 to display the management value and the measurement value in a form of the first monitoring image 58 shown in FIG. 11. Subsequently, in step S24 shown in FIG. 12, the control device control unit 36 determines whether the measurement value has exceeded the management value. When a determination result in step S24 is YES, that is, a result that the measurement value has exceeded the management value, the control device control unit 36 shifts to step S25. When the determination result in step S24 is NO, that is, a result that the measurement value has not exceeded the management value, the control device control unit 36 shifts to step S26.

In step S25, the control device control unit 36 causes the display monitor 7 to display a warning. At this time, the control device control unit 36 causes the display monitor 7 to display the warning in the form of the first monitoring image 58 shown in FIG. 11. At this time, the warning can be displayed, for example, in a field of a state of the first monitoring image 58 shown in FIG. 13. In an example shown in FIG. 13, an internal temperature of the projector 3 of the large hall-1 has exceeded the management value. By causing the display monitor 7 to display the warning in the form of the first monitoring image 58, the operator of the control system 1 can obviously grasp in which projector 3 the warning has occurred.

Note that a method of displaying a warning on the first monitoring image 58 is not limited to display by characters. For example, the warning can also be expressed by, for example, inverting a color of the apparatus icon 53 of a relevant projector 3 or flashing the apparatus icon 53. The warning can also be expressed by, for example, flashing a relevant measurement value or highlighting the measurement value.

Referring back to FIG. 12, in step S26, the control device control unit 36 stores the measurement value in the control device memory 37 shown in FIG. 4. Subsequently, in step S27 shown in FIG. 12, the control device control unit 36 determines whether a monitoring end instruction has been given. When a determination result in step S27 is YES, that is, the monitoring end instruction has been given, the control device control unit 36 ends the display processing. When the determination result in step S27 is NO, that is, the monitoring end instruction has not been given, the control device control unit 36 shifts to step S22. Note that step S23 and step S25 shown in FIG. 12 correspond to the display controller 38. Step S24 corresponds to the determination controller 39.

Figure 14:
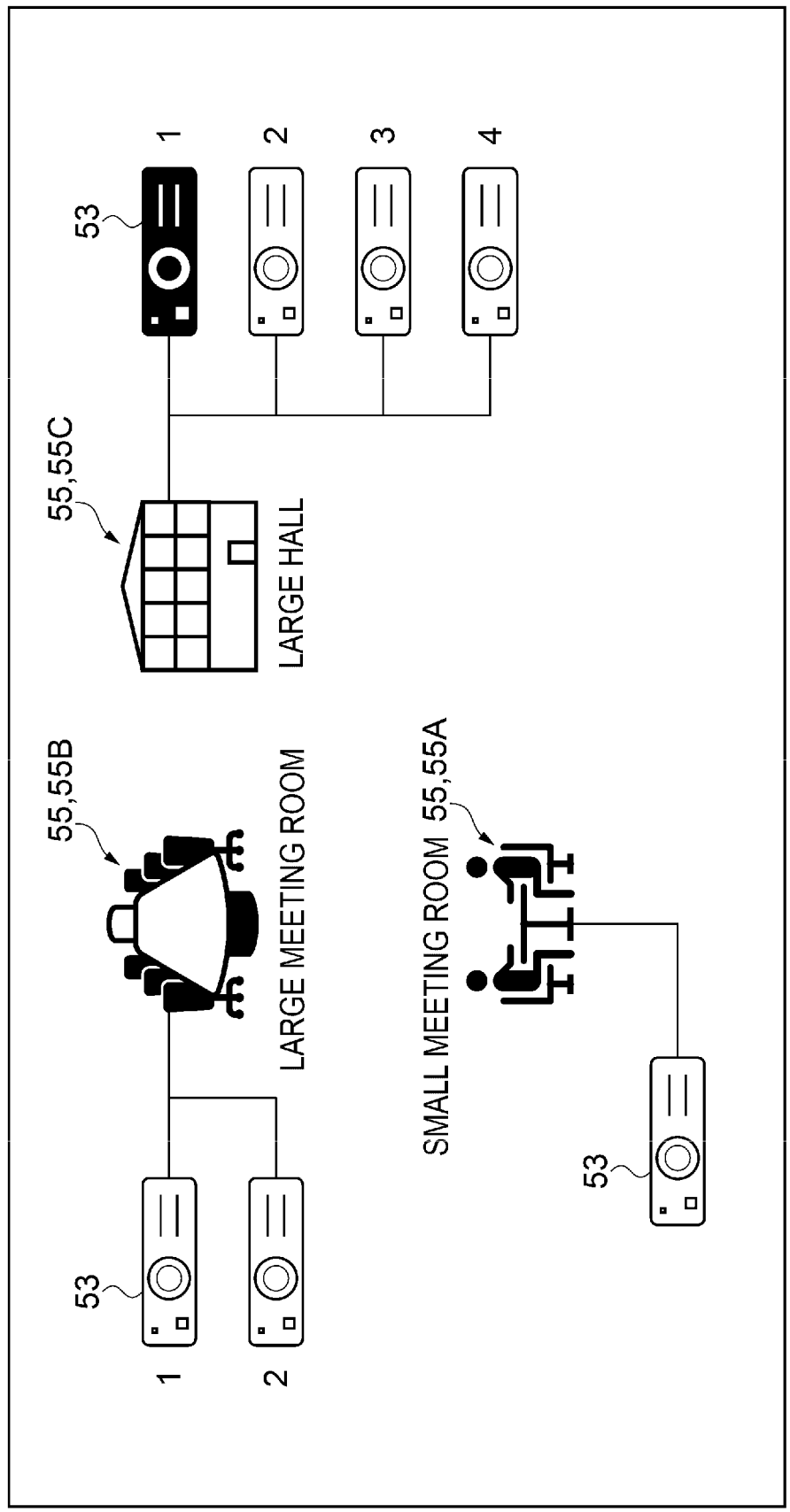
FIG. 14 is a diagram showing an example of a second monitoring image.

FIG. 14 shows an example of a second monitoring image 59. The second monitoring image 59 is a display image corresponding to the second display image 54 shown in FIG. 7. As shown in FIG. 14, the second monitoring image 59 shows monitoring results of the plurality of projectors 3 using the group icons 55 and the apparatus icons 53. The second monitoring image 59 shown in FIG. 14 is an example on which the result example of the first monitoring image 58 shown in FIG. 13 is reflected. In the example of the first monitoring image 58 shown in FIG. 13, a warning for an internal temperature of the projector 3 in the large hall-1 has occurred. The example of the second monitoring image 59 shown in FIG. 14 reflects this result.

Figure 15:
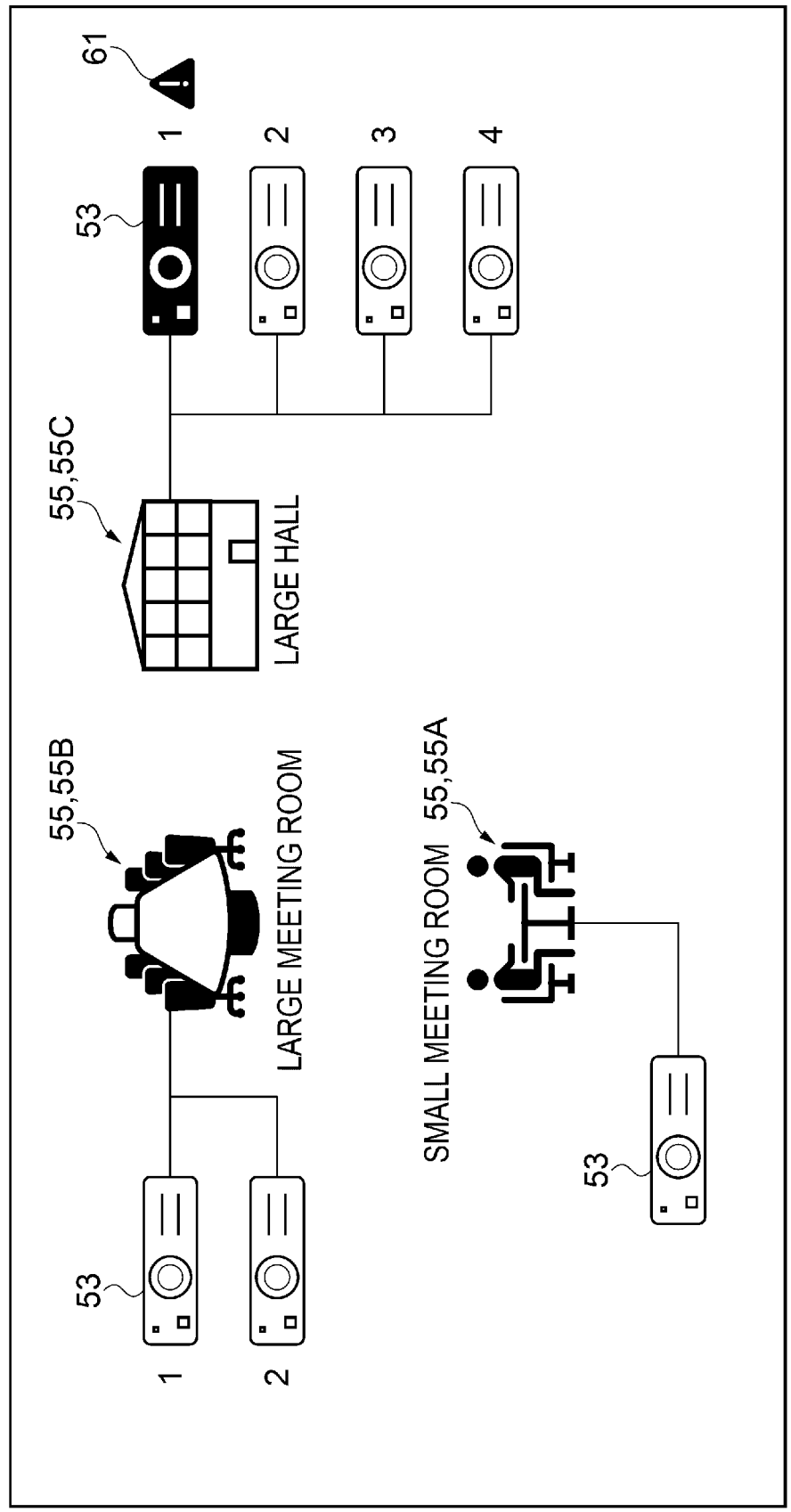
FIG. 15 is a diagram showing an example of the second monitoring image.

As shown in FIG. 14, a color of the apparatus icon 53 of the projector 3 of the large hall-1 has been inverted. The warning is indicated by the color inversion of the apparatus icon 53. With the second monitoring image 59 shown in FIG. 14, the operator of the control system 1 can visually view states of the plurality of projectors 3 in a list format. Consequently, it is possible to improve a visual effect concerning grasping of a monitoring state. Note that a method of displaying a warning on the second monitoring image 59 is not limited to the color inversion of the apparatus icon 53. For example, the warning can be expressed by flashing the apparatus icon 53. Further, for example, as shown in FIG. 15, the warning can also be expressed by displaying a warning icon 61 indicating the warning on the apparatus icon 53 of a relevant projector 3. Two methods among these methods can also be combined or three or more methods among these methods can also be combined.

Figure 16:
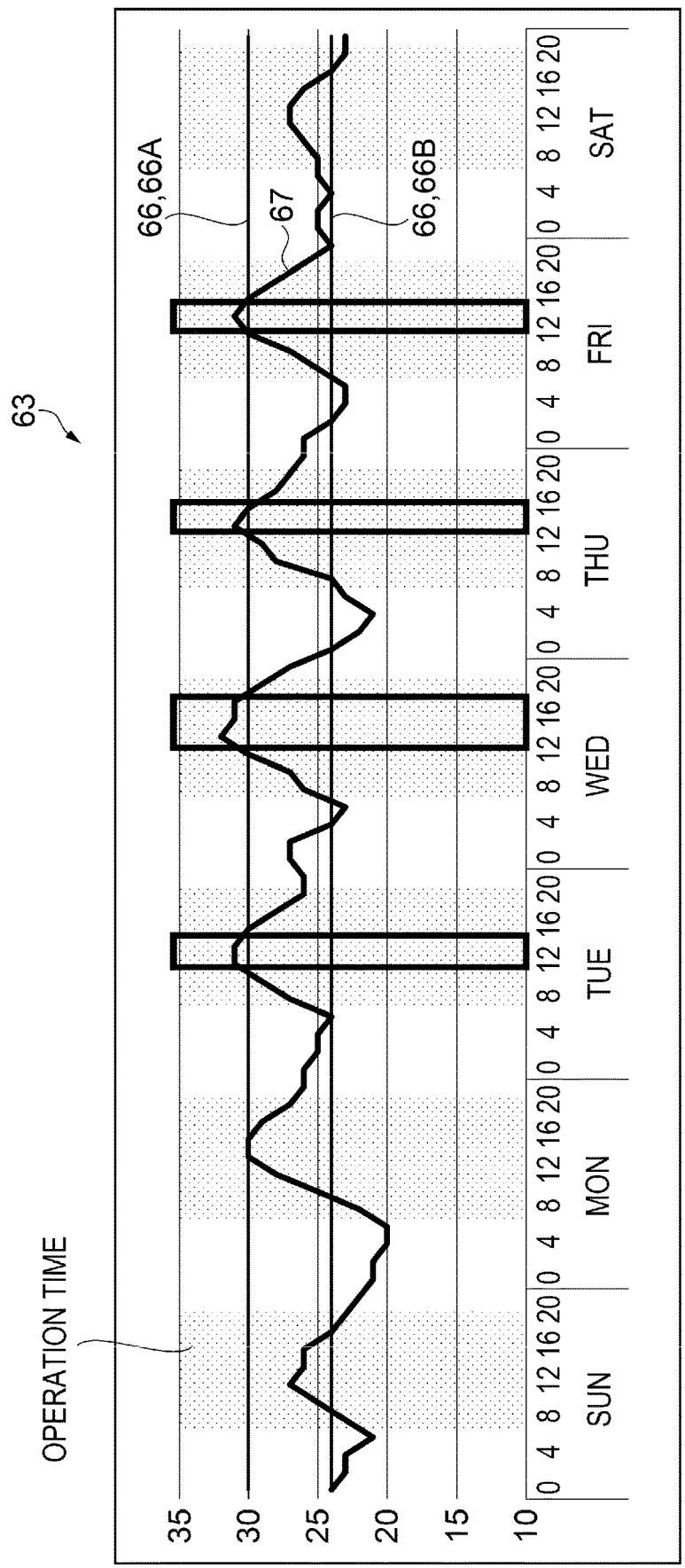
FIG. 16 is a diagram showing an example of a first report image.

FIG. 16 shows an example of a first report image 63. The first report image 63 is one of periodic reports prepared for each of notification periods. The arithmetic operation controller 40 shown in FIG. 4 prepares the first report image 63 for each of the notification periods. The notification period is input via the reception image 57 shown in FIG. 9. That is, the notification period is a period input by the operator of the control system 1. The notification period is an example of the predetermined time interval. In the example shown in FIG. 9, the notification period is set to thirty days. When the notification period is set to thirty days, the arithmetic operation controller 40 shown in FIG. 4 prepares the first report image 63 every time thirty days elapses. In the example shown in FIG. 16, the first report image 63 indicates a monitoring result for immediately preceding thirty days. That is, the first report image 63 is a history of monitoring results in the past.

In the example shown in FIG. 16, a result of internal temperatures for seven days in the monitoring result for thirty days is excerpted. As shown in FIG. 16, in the first report image 63, management lines 66 and a measurement value 67 are represented as graphs. The management lines 66 are management values of temperatures input via the reception image 57 shown in FIG. 9. As shown in FIG. 16, the management line 66 corresponding to 30° C., which is an upper management value of management values of temperature, is a management line 66A. The management line 66 corresponding to 24° C., which is a lower management value of the management values of temperature, is a management line 66B. The measurement value 67 is a measurement value of an internal temperature stored in the management device memory 37 shown in FIG. 4. The first report image 63 shown in FIG. 16 is displayed on the display monitor 7 shown in FIG. 1. The display by the display monitor 7 is controlled by the display controller 38 shown in FIG. 4.

The first report image 63 shown in FIG. 16 can display a management value, input of which has been received by the control device 4, and the measurement value 67 in the past acquired from the projector 3 by the control device 4. Therefore, with the control device 4, the management value and the measurement value 67 can be informed to the operator of the control system 1 via the display monitor 7. The management value is a management value for a factor concerning an environment in which the projector 3 is disposed. The measurement value 67 is a measurement value in the past for a factor acquired from the sensor group 22. With the first report image 63, the operator of the control system 1 can grasp a history of monitoring results in the past. In the first report image 63, when there is a history in which the measurement value 67 exceeded the management line 66, a part where the measurement value 67 exceeded the management line 66 is highlighted. In the example shown in FIG. 16, the part where the measurement value 67 exceeded the management line 66 is highlighted by being surrounded in a frame shape. Consequently, the operator of the control system 1 can obviously grasp the part where the measurement value 67 exceeded the management line 66.

FIG. 17 shows an example of a second report image 68. The second report image 68 is one of the periodic reports prepared for each of the notification periods. The arithmetic operation controller 40 shown in FIG. 4 prepares the second report image 68 for each of the notification periods. The periodic reports prepared for each of the notification periods include the first report image 63 and the second report image 68 explained above. The second report image 68 is a history of monitoring results in the past corresponding to the notification period. The second report image 68 is displayed on the display monitor 7 shown in FIG. 1. The display by the display monitor 7 is controlled by the display controller 38 shown in FIG. 4.

As shown in FIG. 17, in the second report image 68, histories of monitoring results of the plurality of projectors 3 can be visually recognized in a list format. The second report image 68 displays a group name, an equipment name, a model number, an operation time, a temperature warning history, and a humidity warning history. The group name, the equipment name, the model number, and the operation time are the same as those of the first monitoring image 58 shown in FIG. 11. Therefore, explanation thereof is omitted.

The temperature warning history indicates the number of times internal temperatures exceeded a management value in monitoring results in the past corresponding to the notification period. The humidity warning history indicates the number of times internal humidities exceed a management value in the monitoring results in the past corresponding to the notification period. With the second report image 68, the operator of the control system 1 can grasp the number of times measurement values exceeded a management value in a history of monitoring results in the past. Note that, in this embodiment, an example in which the periodic report is displayed for each of the notification periods is explained. However, an example in which a periodic report is displayed at a designated date and time can also be applied. In this case, the reception image 57 only has to be changed to the reception image 57 that receives input of the designated date and time instead of the input of the notification period.

Figure 18:
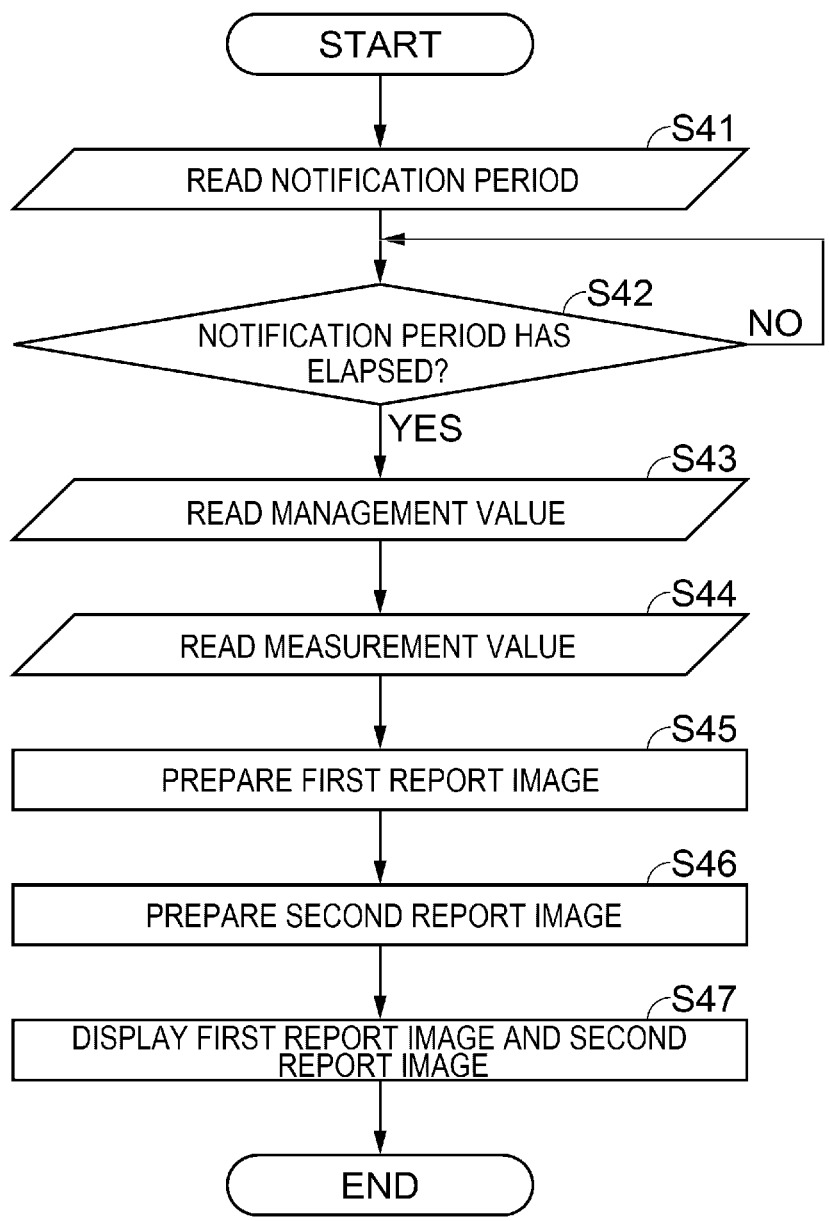
FIG. 18 is a flowchart showing a flow of report display processing for displaying a periodic report.

FIG. 18 shows a flow of report display processing for displaying a periodic report. The report display processing is implemented by the control device control unit 36 of the control device 4 executing a report display method according to a report display program. The report display processing for the periodic report includes step S41 to step S47. In step S41, the control device control unit 36 reads a notification period from the control device memory 37. Subsequently, in step S42, the control device control unit 36 determines whether the notification period has elapsed. When a determination result in step S42 is YES, that is, when the notification period has elapsed, the control device control unit 36 shifts to step S43. When the determination result in step S42 is NO, that is, the notification period has not elapsed, the control device control unit 36 repeats the processing in step S42 until the notification period elapses.

In step S43, the control device control unit 36 reads a management value from the control device memory 37. Subsequently, in step S44, the control device control unit 36 reads a measurement value from the control device memory 37. The measurement value read from the control device memory 37 is the information group 51 acquired from the projector 3 in the past. Note that the information group 51 acquired from the projector 3 is stored in the control device memory 37 shown in FIG. 4 by the control device control unit 36 in step S26 shown in FIG. 12.

Referring back to FIG. 18, in step S45, the control device control unit 36 prepares the first report image 63. Subsequently, in step S46, the control device control unit 36 prepares the second report image 68. Subsequently, in step S47, the control device control unit 36 causes the display monitor 7 to display the first report image 63 and the second report image 68. Step S45 and step S46 shown in FIG. 18 correspond to the arithmetic operation controller 40 shown in FIG. 4. Step S47 shown in FIG. 18 corresponds to the display controller 38.

Figure 19:
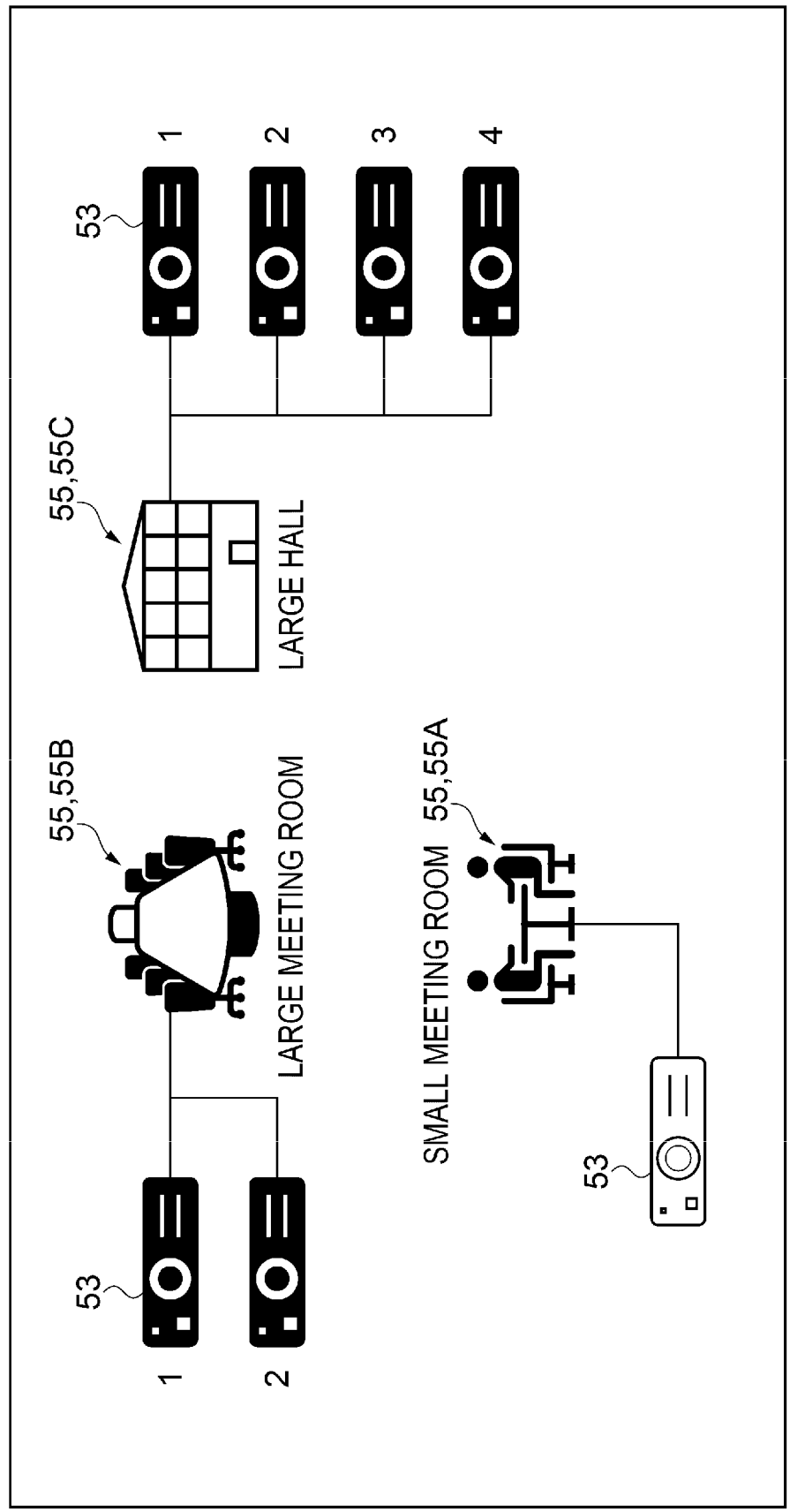
FIG. 19 is a diagram showing an example of a third report image.

FIG. 19 shows an example of a third report image 69. The third report image 69 is one of the periodic reports prepared for each of the notification periods. The arithmetic operation controller 40 shown in FIG. 4 prepares the third report image 69 for each of the notification periods. The periodic reports prepared for each of the notification periods include the first report image 63, the second report image 68, and the third report image 69 explained above. The third report image 69 is a history of monitoring results in the past corresponding to the notification period. The third report image 69 is displayed on the display monitor 7 shown in FIG. 1. The display by the display monitor 7 is controlled by the display controller 38 shown in FIG. 4.

As shown in FIG. 19, the third report image 69 shows histories of monitoring results of the plurality of projectors 3 using the group icons 55 and the apparatus icons 53. In the example shown in FIG. 19, a color of the apparatus icons 53 of the projectors 3 having histories in which measurement values exceeded management values in the monitoring results in the past corresponding to the notification period are inverted and displayed. With the third report image 69, the operator of the control system 1 can grasp the projectors 3 having the histories in which the measurement values exceeded the management values in the monitoring results in the past corresponding to the notification period.

With the third report image 69 shown in FIG. 19, the operator of the control system 1 can visually view histories of monitoring results of the plurality of projectors 3 in a list format. Consequently, it is possible to improve a visual effect concerning grasping of the histories of the monitoring results. Note that a method of displaying a history in which a measurement value exceeded a management value on the third report image 69 is not limited to the color inversion of the apparatus icon 53. For example, the history in which the measurement value exceeded the management value can also be expressed by flashing the apparatus icon 53. Further, for example, as shown in FIG. 15, the history in which the measurement value exceeded the management value can also be expressed by displaying the warning icon 61 indicating a warning on the apparatus icon 53 of a relevant projector 3. Two methods among these methods can also be combined or three or more methods among these methods can also be combined.

Figure 20:
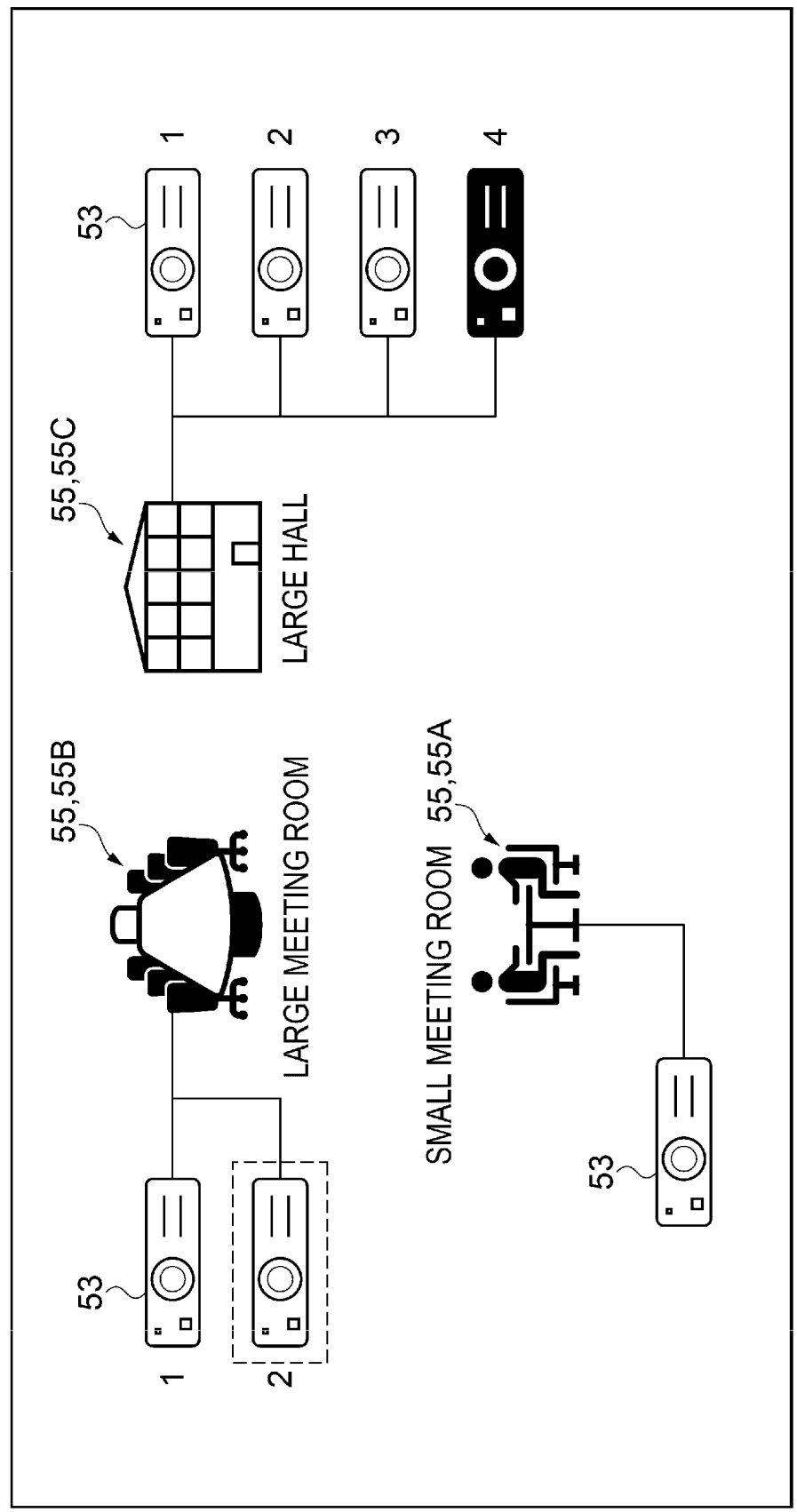
FIG. 20 is a diagram showing an example of a third monitoring image.

A display image obtained by compounding the third report image 69 and the second monitoring image 59 shown in FIG. 14 can also be applied. FIG. 20 shows an example of a third monitoring image 71. The third monitoring image 71 is a display image obtained by compounding the third report image 69 shown in FIG. 19 and the second monitoring image 59 shown in FIG. 14. That is, the third monitoring image 71 displays monitoring results of the plurality of projectors 3 in real time and displays a history in which a measurement value exceeded a management value in monitoring results in the past corresponding to a notification period. In the third monitoring image 71, a color of the apparatus icon 53 of the projector 3 in which a measurement value has exceeded a management value in real time is inverted and displayed. Further, in the third monitoring image 71, the apparatus icon 53 of the projector 3 having a history in which a measurement value exceeded a management value in the monitoring results in the past corresponding to the notification period is surrounded by a broken line.

In the example shown in FIG. 20, a measurement value has exceeded a management value in real time in the projector 3 of the large hall-4. A history in which a measurement value exceeded a management value in the monitoring results in the past corresponding to the notification period is present in the projector 3 of the large meeting room 9B. With the third monitoring image 71, the operator of the control system 1 can grasp the projector 3 in which the measurement value has exceeded the management value in real time and the projector 3 having the history in which the measurement value exceeded the management value in the past.

Figure 21:
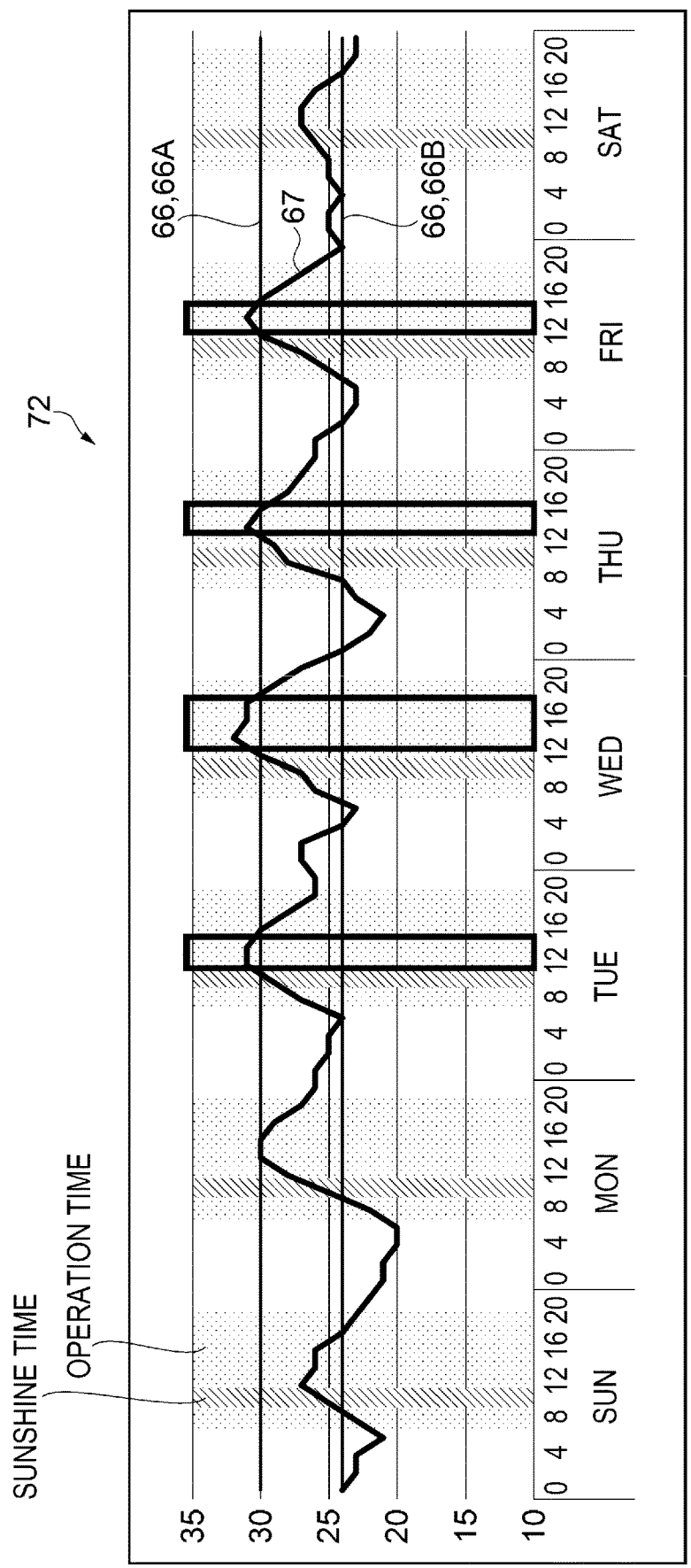
FIG. 21 is a diagram showing an example of a fourth report image.

FIG. 21 shows an example of a fourth report image 72. The fourth report image 72 is one of the periodic reports prepared for each of the notification periods. The arithmetic operation controller 40 shown in FIG. 4 prepares the fourth report image 72 for each of the notification periods. The fourth report image 72 is a periodic report obtained by adding the information concerning the sunshine influence shown in FIG. 9 to the first report image 63 shown in FIG. 16. In the fourth report image 72, the information concerning the sunshine influence is displayed as a sunshine time. In the fourth report image 72, a time period in which the sun's radiation is incident on the projector 3 is highlighted. As explained above, the information concerning the sunshine influence is one of the supplementary information. Therefore, the fourth report image 72 is a periodic report obtained by adding the supplementary information to the first report image 63 shown in FIG. 16.

The fourth report image 72 is a history of monitoring results in the past corresponding to the notification period. The fourth report image 72 is displayed on the display monitor 7 shown in FIG. 1. The display by the display monitor 7 is controlled by the display controller 38 shown in FIG. 4. The periodic reports can include the fourth report image 72 instead of the first report image 63. That is, the periodic reports may include the fourth report image 72, the second report image 68, and the third report image 69. Further, the periodic reports may include the fourth report image 72, the second report image 68, and the third report image 69 in addition to the first report image 63.

With the fourth report image 72, the operator of the control system 1 can grasp a history of monitoring results in the past. In the fourth report image 72, when there is a history in which the measurement value 67 exceeded the management line 66, a part where the measurement value 67 exceeded the management line 66 is highlighted. In the example shown in FIG. 21, the part where the measurement value 67 has exceeded the management line 66 is highlighted by being surrounded in a frame shape. Consequently, the operator of the control system 1 can obviously grasp the part where the measurement value 67 has exceeded the management line 66. Further, in the fourth report image 72, information indicating a relation between a time period in which the measurement value 67 has exceeded the management line 66 and the supplementary information can be displayed. Therefore, in the fourth report image 72, since the supplementary information is added, it is possible to inform the operator of the control system 1 of the relation between the time period in which the measurement value 67 has exceeded the management line 66 and the supplementary information.

In the example shown in FIG. 21, an internal temperature starts to rise around 8:00 AM and the rise increases after 10:00 AM when the sun's radiation is incident. Therefore, it is possible to obtain information indicating that it is desirable to review temperature management in the morning. Consequently, the operator of the control system 1 can obtain a clue to find measures to, for example, enhance air conditioning and block sunshine.

Figure 22:
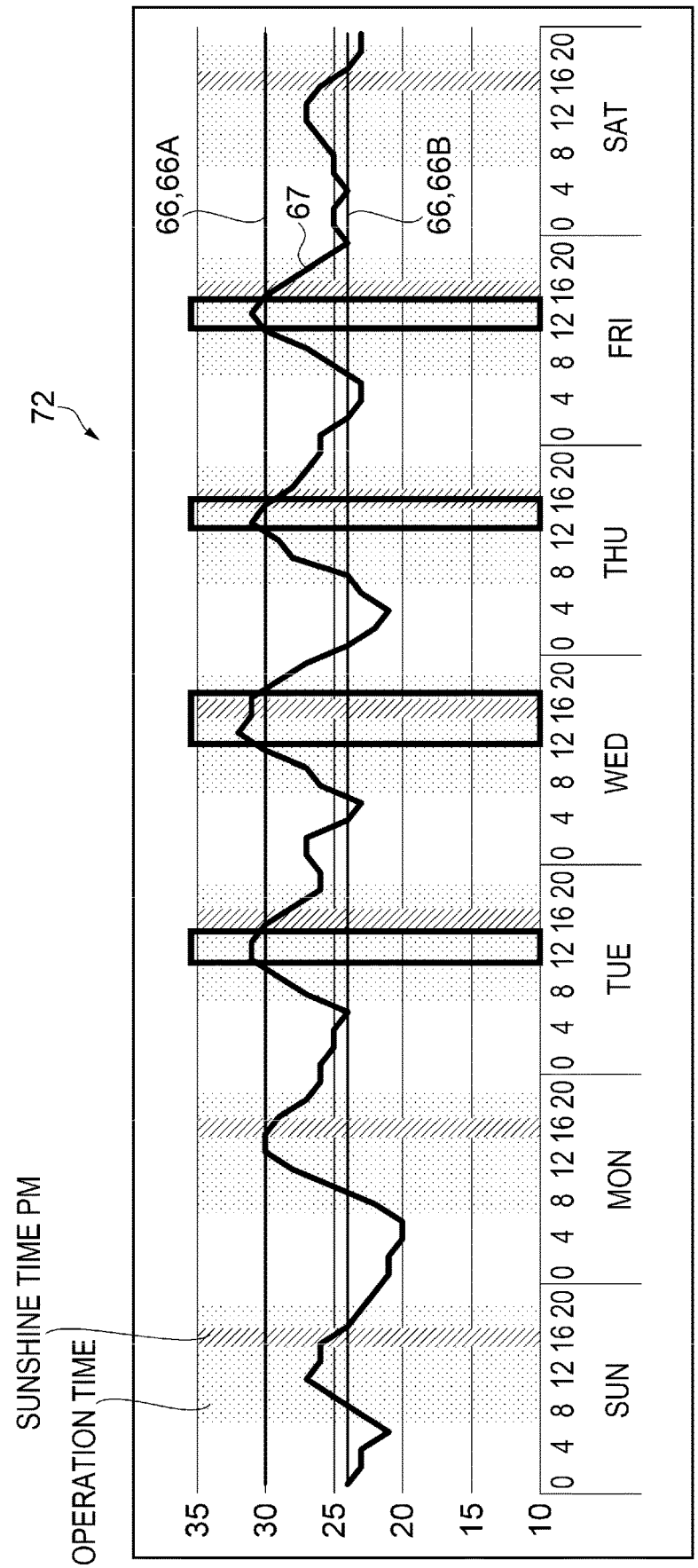
FIG. 22 is a diagram showing another example of the fourth report image.

FIG. 22 shows another example of the fourth report image 72. In the example shown in FIG. 22, a time period of 16:00 to 17:00 is input as a time period in which the sun's radiation is incident on the projector 3. In the example shown in FIG. 22, a time period in which the measurement value 67 has exceeded the management line 66 and a sunshine time overlap on Wednesday. However, in the other days of week, time periods in which the measurement value 67 has exceeded the management line 66 and the sunshine time do not coincide. From the fourth report image 72 shown in FIG. 22, the operator of the control system 1 can determine not to consider the influence of the sun's radiation concerning the rise of the internal temperature.

Abnormality occurrence display for displaying that an abnormality has occurred in one of three projectors 3 in the control system 1 is explained. Three among the four projectors 3 of the large hall 9C shown in FIG. 1 are explained as an example. The three projectors 3 are identified as a first projector 3A, a second projector 3B, and a third projector 3C. The first projector 3A, the second projector 3B, and the third projector 3C may be any ones of the four projectors 3 of the large hall 9C.

FIG. 23 shows an example of information groups 51 acquired from the three projectors 3. The three projectors 3 are the first projector 3A, the second projector 3B, and the third projector 3C. The information group 51 acquired from the first projector 3A is a first information group 51A. The information group 51 acquired from the second projector 3B is a second information group 51B. The information group 51 acquired from the third projector 3C is a third information group 51C. Kinds of information in the first information group 51A are first information. Kinds of information in the second information group 51B are second information. Kinds of information in the third information group 51C are third information. The first information is an example of the first measurement value. The second information is an example of the second measurement value. The third information is an example of the third measurement value.

In the example shown in FIG. 23, an internal temperature of the first information group 51A is different from internal temperatures of the second information group 51B and the third information group 51C. That is, in the example shown in FIG. 23, the difference between the internal temperature of the second information group 51B and the internal temperature of the third information group 51C is within a predetermined range and the difference between the internal temperature of the first information group 51A and the internal temperature of the second information group 51B exceeds the predetermined range. The predetermined range concerning an internal temperature is 10° C. In the control system 1, when the example shown in FIG. 23 occurs, abnormality occurrence display is performed. The abnormality occurrence display is performed on the display motor 7 shown in FIG. 1. The display by the display monitor 7 is controlled by the display controller 38 shown in FIG. 4. The abnormality occurrence display is performed on the first monitoring image 58 and the second monitoring image 59.

The first projector 3A, the second projector 3B, and the third projector 3C are disposed in the same environment, that is, the large hall 9C. Therefore, for these three projectors, it is efficient to implement, at the same timing, maintenance work such as replacement of consumable components. Timings of the maintenance work being different in the three projectors is inefficient because projection in the large hall 9C has to be frequently stopped. The abnormality occurrence display is implemented when one of the three projectors has a value different from values of the other two projectors in any one of the six kinds of information, which are the factors concerning the environment in which the projectors 3 are disposed. With the abnormality occurrence display, it is possible to inform that a measurement value of the first projector 3A is different from measurement values of the other projectors among the three projectors 3 belonging to the same group 9.

With the abnormality occurrence display, it is possible to give a clue for the operator of the control system 1 to examine measures for preventing timings of maintenance work from being different among the three projectors 3 in the group 9. As the measures for preventing timings of maintenance work from being different, various methods are conceivable. For example, there is a method of applying additional cleaning with auxiliary air conditioning for, for example, additionally installing an external fan. There is also a method of installing a sunshade for blocking the sun's radiation. There are measures to, for example, install a wind shield for air conditioning and adjust a louver of air conditioning when temperature is too low. Note that the number of the projectors 3 belonging to the group 9 is not limited to three. The number of the projectors 3 belonging to the group 9 may be more than three.

A summary of the present disclosure is noted below.

Note 1

A control device including: an optical device; and at least one processor configured to control display on the optical device, wherein the at least one processor implements: causing the optical device to display a reception image for receiving input of a management value for a factor concerning an environment in which a display apparatus is disposed; acquiring a measurement value for the factor from a sensing device provided in the display apparatus; and causing the optical device to display the management value and the measurement value.

With the control device, it is possible to urge, with the reception image displayed on the optical device, an operator to input the management value. The control device causes the optical device to display the management value and the measurement value. Therefore, it is possible to inform, via the optical device, the operator of the management value for the factor concerning the environment in which the display apparatus is disposed and the measurement value for the factor acquired from the sensing device. A user can grasp the difference between the input management value and the measurement value indicating an actual use environment by referring to the display.

Note 2

The control device described in Note 1, wherein, when the measurement value exceeded the management value, the at least one processor may cause the optical device to display information indicating that the measurement value exceeded the management value.

With the control device, when the measurement value exceeded the management value, it is possible to inform the operator that the measurement value exceeded the management value.

Note 3

The control device described in Note 1 or 2, wherein the display apparatus may include a fan, and the factor may be at least one of temperature, humidity, and rotating speed of the fan.

With the control device, it is possible to inform the operator of at least one state of the temperature, the humidity, and the rotating speed of the fan.

Note 4

The control device described in any one of Notes 1 to 3, wherein the at least one processor may further implement: causing the optical device to display a supplementary information reception image for receiving input of supplementary information including at least one of first time period information indicating a time period in which sun's radiation is incident on the display apparatus and second time period information indicating a time period in which an air conditioner acting on the display apparatus operates; and, when the measurement value exceeded the management value, when causing the optical device to display information indicating that the measurement value exceeded the management value, causing the optical device to display information indicating a relation between a time period in which the measurement value exceeded the management value and the supplementary information.

With the control device, it is possible to inform the operator of the relation between the time period in which the measurement value exceeded the management value and the supplementary information.

Note 5

The control device described in any one of Notes 1 to 4, wherein the at least one processor may implement, at a predetermined time interval or a designated date and time, causing the optical device to display the management value and the measurement value.

With the control device, it is possible to inform the management value and the measurement value at the predetermined time interval or the designated date and time.

Note 6

The control device described in any one of Notes 1 to 5, wherein, when the display apparatus is represented as a first display apparatus, a plurality of the display apparatuses including the first display apparatus may be divided into a plurality of groups for each environment in which the display apparatus is disposed, a second display apparatus different from the first display apparatus and a third display apparatus different from the first display apparatus and the second display apparatus may be included in a first group to which the first display apparatus belongs, and the at least one processor may acquire the measurement value in the first display apparatus as a first measurement value, acquire the measurement value in the second display apparatus as a second measurement value, and acquire the measurement value in the third display apparatus as a third measurement value, and, when a difference between the second measurement value and the third measurement value is within a predetermined range and a difference between the first measurement value and the second measurement value exceeds the predetermined range, implement causing the optical device to display information concerning the first measurement value.

With the control device, it is possible to inform that the measurement value of the first display apparatus is different from the measurement values of the other display apparatuses among the first display apparatus, the second display apparatus, and the third display apparatus belonging to the same group.

Note 7

A display method including: receiving input of a management value for a factor concerning an environment in which a display apparatus is disposed; acquiring a measurement value for the factor from a sensing device provided in the display apparatus; and displaying the management value and the measurement value on an optical device.

In the display method, the management value and the measurement value are displayed on the optical device. Therefore, it is possible to inform, via the optical device, an operator of the management value for the factor concerning the environment in which the display apparatus is disposed and the measurement value for the factor acquired from the sensing device.

Note 8

A non-transitory computer-readable storage medium storing a program, the program causing a processor to execute: receiving input of a management value for a factor concerning an environment in which a display apparatus is disposed; acquiring a measurement value for the factor from a sensing device provided in the display apparatus; and causing an optical device to display the management value and the measurement value.

With the non-transitory computer-readable storage medium storing the program, the management value and the measurement value can be displayed on the optical device. Therefore, it is possible to inform, via the optical device, an operator of the management value for the factor concerning the environment in which the display apparatus is disposed and the measurement value for the factor acquired from the sensing device.

What is claimed is:
1. A control device comprising:
an optical device; and
at least one processor configured to control display on the optical device, wherein
the at least one processor implements:
causing the optical device to display a reception image for receiving input of a management value for a factor concerning an environment in which a display apparatus is disposed;
acquiring a measurement value for the factor from a sensing device provided in the display apparatus;
causing the optical device to display the management value and the measurement value;
causing the optical device to display a supplementary information reception image for receiving input of supplementary information including at least one of first time period information indicating a time period in which sun radiation is incident on the display apparatus and second time period information indicating a time period in which an air conditioner acting on the display apparatus operates; and when the measurement value exceeded the management value, when causing the optical device to display information indicating that the measurement value exceeded the management value, causing the optical device to display information indicating a relation between a time period in which the measurement value exceeded the management value and the supplementary information.

2. The control device according to claim 1, wherein, when the measurement value exceeded the management value, the at least one processor causes the optical device to display information indicating that the measurement value exceeded the management value.

3. The control device according to claim 1, wherein
the display apparatus includes a fan, and
the factor is at least one of temperature, humidity, and rotating speed of the fan.

4. The control device according to claim 1, wherein the at least one processor implements, at a predetermined time interval or a designated date and time, causing the optical device to display the management value and the measurement value.

5. The control device according to claim 1, wherein
when the display apparatus is represented as a first display apparatus, a plurality of the display apparatuses including the first display apparatus are divided into a plurality of groups for each environment in which the display apparatus is disposed,
a second display apparatus different from the first display apparatus and a third display apparatus different from the first display apparatus and the second display apparatus are included in a first group to which the first display apparatus belongs, and
the at least one processor acquires the measurement value in the first display apparatus as a first measurement value, acquires the measurement value in the second display apparatus as a second measurement value, and acquires the measurement value in the third display apparatus as a third measurement value, and
when a difference between the second measurement value and the third measurement value is within a predetermined range and a difference between the first measurement value and the second measurement value exceeds the predetermined range, implements causing the optical device to display information concerning the first measurement value.

6. A display method comprising:
receiving input of a management value for a factor concerning an environment in which a display apparatus is disposed;
acquiring a measurement value for the factor from a sensing device provided in the display apparatus;
displaying the management value and the measurement value on an optical device;
causing the optical device to display a supplementary information reception image for receiving input of supplementary information including at least one of first time period information indicating a time period in which sun radiation is incident on the display apparatus and second time period information indicating a time period in which an air conditioner acting on the display apparatus operates; and
when the measurement value exceeded the management value, when causing the optical device to display information indicating that the measurement value exceeded the management value, causing the optical device to display information indicating a relation between a time period in which the measurement value exceeded the management value and the supplementary information.

7. A non-transitory computer-readable storage medium storing a program, the program causing a processor to execute:
receiving input of a management value for a factor concerning an environment in which a display apparatus is disposed;
acquiring a measurement value for the factor from a sensing device provided in the display apparatus;
causing an optical device to display the management value and the measurement value;
causing the optical device to display a supplementary information reception image for receiving input of supplementary information including at least one of first time period information indicating a time period in which sun radiation is incident on the display apparatus and second time period information indicating a time period in which an air conditioner acting on the display apparatus operates; and
when the measurement value exceeded the management value, when causing the optical device to display information indicating that the measurement value exceeded the management value, causing the optical device to display information indicating a relation between a time period in which the measurement value exceeded the management value and the supplementary information.

* * * * *